United States Patent
Mansfield

(10) Patent No.: US 12,021,687 B2
(45) Date of Patent: Jun. 25, 2024

(54) AUTONOMOUS OPTIMIZATION OF INTRA-TRAIN COMMUNICATION NETWORK

(71) Applicant: Amsted Rail Company, Inc., Chicago, IL (US)

(72) Inventor: Edward J. Mansfield, Blue Bell, PA (US)

(73) Assignee: Amsted Rail Company, Inc., Chicago, IL (US)

( * ) Notice: Subject to any disclaimer, the term of this patent is extended or adjusted under 35 U.S.C. 154(b) by 0 days.

(21) Appl. No.: 18/161,125

(22) Filed: Jan. 30, 2023

(65) Prior Publication Data
US 2023/0254204 A1    Aug. 10, 2023

Related U.S. Application Data

(63) Continuation of application No. 16/387,029, filed on Apr. 17, 2019, now Pat. No. 11,595,256.
(Continued)

(51) Int. Cl.
*H04L 41/082* (2022.01)
*B61L 15/00* (2006.01)
(Continued)

(52) U.S. Cl.
CPC ........ *H04L 41/082* (2013.01); *B61L 15/0027* (2013.01); *B61L 15/0081* (2013.01);
(Continued)

(58) Field of Classification Search
CPC ... H04L 41/082; H04L 41/0823; H04L 43/08; H04L 43/16; H04L 67/12; H04L 67/34;
(Continued)

(56) References Cited

U.S. PATENT DOCUMENTS

| 4,934,877 A | 6/1990 | Haverick et al. |
| 5,682,139 A | 10/1997 | Pradeep et al. |

(Continued)

FOREIGN PATENT DOCUMENTS

| EP | 1548419 | 6/2005 |
| EP | 1535418 | 11/2007 |

(Continued)

OTHER PUBLICATIONS http://web.archive.org/web/20130206222004/http://lat-lon.com/gps-products/-locomotive-monitoring-unit,http://web.archive.org/web/20130206221020/http://lat-lon.com/gps-products- /solar-tracking-unit http://web.archive.org/web/20130205074831/http://lat-lon.com/gps-products- -sensors Available on the Internet at least as early as Feb. 6, 2013.

(Continued)

*Primary Examiner* — Peter D Nolan
*Assistant Examiner* — Demetra R Smith-Stewart
(74) *Attorney, Agent, or Firm* — Fox Rothschild LLP

(57) ABSTRACT

A system for dynamically adjusting a configuration of an intra-train communication network includes an electronic device and a computer-readable storage medium. The computer-readable storage medium has one or more programming instructions that, when executed, cause the electronic device to receive one or more parameters values associated with a train consist, determine whether a potentially adverse condition that would affect intra-train communication for the train consist is anticipated based on at least a portion of the received parameters, in response to determining that the potentially adverse condition is anticipated, identify one or more updated network parameter settings that will assist in maintaining intra-train communication of the train consist during an occurrence of the potentially adverse condition by (Continued)

executing a machine learning model, and implement the identified one or more updated network parameter settings.

20 Claims, 16 Drawing Sheets

Related U.S. Application Data

(60) Provisional application No. 62/658,888, filed on Apr. 17, 2018.

(51) Int. Cl.
*B61L 23/04* (2006.01)
*B61L 25/02* (2006.01)
*G01W 1/10* (2006.01)
*H04L 41/0823* (2022.01)
*H04L 43/08* (2022.01)
*H04L 43/16* (2022.01)
*H04L 67/00* (2022.01)
*H04L 67/12* (2022.01)

(52) U.S. Cl.
CPC ........... *B61L 23/042* (2013.01); *B61L 25/025* (2013.01); *G01W 1/10* (2013.01); *H04L 41/0823* (2013.01); *H04L 43/08* (2013.01); *H04L 43/16* (2013.01); *H04L 67/12* (2013.01); *H04L 67/34* (2013.01); *B61L 2205/00* (2013.01); *G01W 2203/00* (2013.01)

(58) Field of Classification Search
CPC ............. B61L 15/0027; B61L 15/0081; B61L 23/042; B61L 25/025; B61L 2205/00; G01W 1/10; G01W 2203/00
See application file for complete search history.

(56) References Cited

U.S. PATENT DOCUMENTS

| | | | |
|---|---|---|---|
| 5,691,980 A | 11/1997 | Welles, II et al. | |
| 6,175,784 B1 | 1/2001 | Jicha et al. | |
| 6,184,798 B1 | 2/2001 | Egri | |
| 6,301,531 B1 | 10/2001 | Pierro et al. | |
| 6,339,397 B1 | 1/2002 | Baker | |
| 6,441,324 B1 | 8/2002 | Stimpson | |
| 6,487,478 B1 | 11/2002 | Azzaro et al. | |
| 6,535,135 B1 | 3/2003 | French et al. | |
| 6,668,216 B2 | 12/2003 | Mays | |
| 7,336,156 B2 | 2/2008 | Arita et al. | |
| 7,688,218 B2 | 3/2010 | LeFebvre et al. | |
| 7,698,962 B2 | 4/2010 | LeFebvre et al. | |
| 7,705,743 B2 | 4/2010 | Barone et al. | |
| 8,060,264 B2 | 11/2011 | Oestermeyer et al. | |
| 8,212,685 B2 | 7/2012 | LeFebvre et al. | |
| 8,244,411 B2 | 8/2012 | Baker | |
| 8,370,006 B2 | 2/2013 | Kumar et al. | |
| 8,672,273 B2 | 3/2014 | Brown et al. | |
| 8,751,290 B2 | 6/2014 | Schullian et al. | |
| 8,820,685 B2 | 9/2014 | Michaut | |
| 8,823,537 B2 | 9/2014 | LeFebvre et al. | |
| 9,026,281 B2 | 5/2015 | Murphy et al. | |
| 9,365,223 B2 | 6/2016 | Martin et al. | |
| 9,663,092 B2 | 5/2017 | Martin et al. | |
| 9,663,124 B2 | 5/2017 | LeFebvre et al. | |
| 9,744,979 B2 | 8/2017 | Habermehl | |
| 9,744,980 B2 | 8/2017 | Henry et al. | |
| 9,981,673 B2 | 5/2018 | Martin et al. | |
| 10,137,915 B2 | 11/2018 | LeFebvre et al. | |
| 11,385,623 B2 | 7/2022 | Cella et al. | |
| 2003/0214417 A1 | 11/2003 | Peltz et al. | |
| 2004/0117076 A1 | 6/2004 | Horst | |
| 2004/0201464 A1 | 10/2004 | Oonishi | |
| 2005/0259619 A1 | 11/2005 | Boettle et al. | |
| 2006/0264221 A1 | 11/2006 | Koike et al. | |
| 2007/0156307 A1 | 7/2007 | Muinonen et al. | |
| 2007/0233335 A1 | 10/2007 | Kumar et al. | |
| 2007/0241610 A1 | 10/2007 | Smith | |
| 2008/0195265 A1 | 8/2008 | Searle et al. | |
| 2008/0252515 A1 | 10/2008 | Oestermeyer et al. | |
| 2009/0173840 A1 | 7/2009 | Brown et al. | |
| 2010/0200307 A1 | 8/2010 | Toms | |
| 2010/0302974 A1 | 12/2010 | Niiyama et al. | |
| 2011/0093144 A1 | 4/2011 | Goodermuth et al. | |
| 2011/0099413 A1* | 4/2011 | Cooper | B61L 15/0081 714/E11.073 |
| 2011/0172856 A1 | 7/2011 | Kull | |
| 2011/0270475 A1 | 11/2011 | Brand et al. | |
| 2011/0282540 A1 | 11/2011 | Armitage et al. | |
| 2012/0051643 A1 | 3/2012 | Ha et al. | |
| 2012/0072266 A1 | 3/2012 | Schullian et al. | |
| 2012/0123617 A1 | 5/2012 | Noffsinger et al. | |
| 2013/0261842 A1* | 10/2013 | Cooper | B61L 25/028 701/1 |
| 2013/0344802 A1 | 12/2013 | Armour et al. | |
| 2014/0089243 A1 | 3/2014 | Oppenheimer | |
| 2014/0121953 A1 | 5/2014 | Kraeling et al. | |
| 2014/0375497 A1 | 12/2014 | Friend et al. | |
| 2015/0060608 A1 | 3/2015 | Carlson et al. | |
| 2015/0083869 A1 | 3/2015 | LeFebvre et al. | |
| 2015/0148984 A1 | 5/2015 | Padulosi et al. | |
| 2016/0272228 A1 | 9/2016 | LeFebvre et al. | |
| 2016/0359741 A1* | 12/2016 | Cooper | H04W 4/44 |
| 2018/0237024 A1 | 8/2018 | Mummidi et al. | |

FOREIGN PATENT DOCUMENTS

| | | |
|---|---|---|
| EP | 1008254 | 6/2008 |
| EP | 2650191 | 10/2013 |
| JP | 05213195 | 8/1993 |
| JP | 05343294 | 12/1993 |
| JP | 08015099 | 1/1996 |
| JP | 10217968 | 8/1998 |
| JP | 11192948 | 7/1999 |
| WO | 2005105536 | 10/2005 |
| WO | 2015081278 | 6/2015 |
| WO | 2015100425 | 7/2015 |
| WO | 2016191711 | 12/2016 |

OTHER PUBLICATIONS

Printout of web pages found at http://lat-lon.com/ Available on the Internet at least as early as Sep. 23, 2013.
Printout of web pages found at http://www.skybitz.com/ Available on the Internet at least as early as Sep. 23, 2013.
Printout of web pages found at http://www.transcore.com/ Available on the Internet at least as early as Sep. 23, 2013.
International Search Report and Written Opinion dated Jul. 19, 2019, issued in Application No. PCT/US19/27903.
Choi et al., "Distributed transmit power control for maximizing end-to-end throughput in wireless multi-hop networks," IEEE 2012 Fourth International Conference on Ubiquitous and Future Networks (ICUFN), pp. 74-79 (2012).

* cited by examiner

AUTONOMOUS OPTIMIZATION OF INTRA-TRAIN COMMUNICATION NETWORK

RELATED APPLICATIONS AND CLAIM OF PRIORITY

This application is a continuation of U.S. patent application Ser. No. 16/387,029, filed Apr. 17, 2019, which claims priority to U.S. Patent Application No. 62/658,888, filed Apr. 17, 2018, the disclosure of which is fully incorporated in its entirety into this document by reference.

BACKGROUND

On-board intra-train communication ("ITC") network systems are becoming of increasing interest to railroads and their stakeholders. The ability to track the location and monitor the condition of a train and a transported commodity within an established train consist adds significant flexibility to rail vehicle fleet management processes.

Current methods for building and managing on-board ITC networks are challenged by several factors. For example, wireless systems are designed with technologies optimized for traditional stationary mesh or star patterned communication grids, as opposed to a moving, single dimension (flatland string-of-pearls) architecture more representative of a train consist. In addition, signal parameters, such as received signal strength indicator (RSSI), used to give a coarse indication of the signal quality, become less accurate as geometry of the communication link is stripped from three dimension space to one, and the network takes on a transitory motion state rather than remaining stationary.

Moreover, integrity of system communication is dependent upon a small number of settable optimization parameters (e.g. child-parent relationship, receive signal strength threshold, slot frame size) which are fix coded at setup, and then at staged intervals as determined by human operators. Network optimization routine is programmed for a fixed solution set (e.g. maximum hop distance, minimum latency time, minimum formation time) regardless of communication environment conditions, and wireless network employs a sole source software protocol for all configurations and conditions. Systems typically have no mechanism to learn from measured data, and use the data to anticipate oncoming changes in the environment, and adapt the communication network parameter settings in response. In addition, there is no autonomous dynamic change capability for ITC network parameters.

On-board ITC network systems often break up in situations of impaired communication. Notable examples of impairment conditions include, without limitation:
- line-of-sight interruption such as in tight turns when devices that have already been formed in a network can no longer communicate as the railcars become oriented to the point where radio paths become broken or corrupted;
- atmospheric attenuation of critical signal paths for network communication when experiencing precipitation;
- multipath scenarios such as when traversing through concrete canyons in urban areas or through long tunnels;
- destructive interference from high signal reflection and spectral congestion environments such as rail yards;
- electromagnetic interference from the locomotive engine emissions or when traversing through electrified track environments; and/or
- interference aberrations from high or sudden vibration conditions due to engine startup, rough track, wheel defects, subsidence and/or uneven terrain that effect network stability.

Further, when the ITC network breaks up, reestablishing the network integrity can be time-consuming, power intensive, and unreliable. The locomotive gateway manager must commence a new network formation process. The network formation process proceeds to reestablish ITC whereby the locomotive gateway manager collects and assesses key parametric information from the individual railcar monitoring devices and reassembles the communication network through an optimization process based on the collected metrics and preset parameters. However, the network formation process may be adversely effected by various factors including, without limitation:
- extended time required to reestablish the communication network and the loss of information during that time;
- extended time required to reestablish the communication network and the persistence of communication breakup in the adverse environment conditions during that time;
- key metrics used to make the critical decisions for network optimization (such as nearest neighbors, child-parent selections, hop distance) have since changed and are no longer valid as the formation process proceeds. (For example, nearest neighbors as selected at the beginning of the network formation process may no longer be optimal or even visible, the established hop distance may no longer be achievable, etc.);
- network formation process proceeds with using the last programmed settable parameters which may no longer be a suitable starting point for the current communication environment;
- optimization routine proceeds with a predetermined solution goal which may not fit the new environment;
- network formation processes exact an acute, unanticipated and unrecoverable toll on power sources, such as battery life of unpowered systems; and/or
- network formation process is not autonomous.

The result can be a sub-optimal communication network susceptible to multiple outage conditions. For example, the result may be an unstable cyclic situation where the network experiences successive breakups as it continues to be impaired by the same or new environmental conditions resulting in a disruptive formation-breakup cycle, and cannot properly form network links for necessary levels of time per the requirements of the coded settings for extended periods of time until the impairment conditions clear. During these prolonged formation periods, valuable data about the condition and/or status of the train consist and/or its individual railcars may be lost and power sources notably curtailed.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In various embodiments a system for dynamically adjusting a configuration of an intra-train communication network includes an electronic device and a computer-readable storage medium. The computer-readable storage medium has one or more programming instructions that, when executed, cause the electronic device to receive one or more parameters values associated with a train consist, determine whether a potentially adverse condition that would affect intra-train communication for the train consist is anticipated based on at least a portion of the received parameters, in response to determining that the potentially adverse condition is anticipated, identify one or more updated network parameter settings that will assist in maintaining intra-train communication of the train consist during an occurrence of the potentially adverse condition by executing a machine learning model, and implement the identified one or more updated network parameter settings.

In some embodiments, the system may identify one or more historical parameter values associated with a previous navigation of at least a portion of a route being travelled by the train consist or by one or more other train consists, and determine whether a potentially adverse condition that would affect intra-train communication for the train consist is anticipated based on at least a portion of the historical parameter values.

The system may receive one or more parameters values associated with a train consist from a gateway of the train consist. The one or more parameter values may be measured by one or more sensors of the train consist. The sensors may include one or more of the following: an accelerometer, a gyroscope, a magnetometer, a motion sensor, a location sensor, a temperature sensor, a humidity sensor, a barometric pressure sensor, or an atmospheric sensor. In some embodiments, the system may receive at least a portion of the one or more parameter values from one or more sensors of the train consist.

In some embodiments, the potentially adverse condition may be a tight turn. The system may receive a centrifugal force measurement or an angular acceleration measurement, and a duration associated with the centrifugal force measurement or the angular acceleration measurement. The system may determine whether the duration associated with the centrifugal force measurement or the angular acceleration measurement exceeds a threshold value, in response to determining that the duration exceeds the threshold value, decrease a hop distance value associated with the train consist, determine whether a link margin value associated with the train consist exceeds a link margin threshold value, and in response to determining that the link margin value does not exceed the link margin threshold value, further decrease the hop distance value until the link margin value exceeds the link margin threshold value.

In various embodiments, the system may determine that the train consist has cleared the tight turn, and restore the hop distance value to a value in effect prior to encountering the tight turn.

In some embodiments, the potentially adverse condition may be a tight turn. The system may receive a centrifugal force measurement or an angular acceleration measurement, and a duration associated with the centrifugal force measurement or the angular acceleration measurement. The system may determine whether the duration associated with the centrifugal force measurement or the angular acceleration measurement exceeds a threshold value, in response to determining that the duration exceeds the threshold value, decrease a parent-child relationship value associated with the train consist, determine whether a link margin value associated with the train consist exceeds a link margin threshold value, and in response to determining that the link margin value does not exceed the link margin threshold value, further decrease the parent-child relationship value until the link margin value exceeds the link margin threshold value.

The system may determine that the train consist has cleared the tight turn, and restore the parent/child relationship value to a value in effect prior to encountering the tight turn.

In some embodiments, the potentially adverse condition may be rough track, broken track or an area of track subsidence. The system may receive a measurement of an amount of vibration being experienced and a location associated with where the measurement was obtained. The system may obtain historical data comprising vibration information experienced by the train consist or one or more of the other train consists during a previous journey, and determine whether at least a portion of the received parameter values correlates to at least a portion of the historical data, and, if so, classifying the one or more parameter values as a causation. The system may determine whether a link margin value exceeds a link margin threshold value, and in response to determining that the link margin value exceeds the link margin threshold value, reduce a hop distance value associated with the train consist and reduce a parent/child relationship value associated with the train consist.

The system may, in response to determining that the link margin value exceeds the link margin threshold value, restore each of the hop distance value and the parent/child relationship value to a value in effect prior to encountering the potentially adverse condition.

In some embodiments, the potential adverse condition may be a weather-related event. The system may receive one or more of a temperature measurement or a humidity measurement, determine whether a duration associated with the temperature measurement or the humidity measurement exceeds a threshold value, in response to determining that the duration exceeds the threshold value, determine whether a link margin value exceeds a link margin threshold value, and in response to determining that the link margin value does not exceed the link margin threshold value, decrease a hop distance value associated with the train consist.

The system may determine whether the hop distance value is less than a hop distance threshold value, and in response to determining that the hop distance value is less than the hop distance threshold value, increase a transmission power value associated with the train consist. The system may determine that the train consist is no longer experiencing the weather-related event, and perform one or more of the following: restore the hop distance value to a value in effect prior to encountering the weather-related event, or restore the transmission power value to a value in effect prior to encountering the weather-related event.

In some embodiments, the potential adverse condition may be inter-symbol interference. The system may receive a link margin value associated with the train consist, determine whether the link margin value exceeds a link margin threshold value, and in response to determining that the link margin value does not exceed the link margin threshold value, decrease a hop distance value until the hop distance value does not exceed a hop distance threshold value, determine whether the link margin value exceeds a link margin threshold value, in response to determining that the link margin value does not exceed the link margin threshold value, reduce a transmission power value associated with the train consist, and determine whether the transmission power value is greater than a minimum output value.

The system may in response to determining that the transmission power value is greater than the minimum output value, determine whether the link margin value exceeds the link margin threshold value, in response to determining that the link margin value does not exceed the link margin threshold value, further reduce the transmission power value associated with the train consist, and determine whether the further reduced transmission power value is greater than a minimum output value.

The system may determine that the train consist is no longer experiencing inter-symbol interference, and restore the transmission power value to a value in effect prior to encountering the inter-symbol interference.

In some embodiments, the potential adverse condition may be noise interference. The system may receive a link margin value associated with the train consist, determine whether the link margin value exceeds a link margin threshold value, and in response to determining that the link margin value does not exceed the link margin threshold value increase a transmission power value associated with the train consist, and determine whether the transmission power value is less than the maximum output value.

The system may in response to determining that the transmission power value is less than the maximum output value, determine whether the link margin value exceeds the link margin threshold value, in response to determining that the link margin value does not exceed the link margin threshold value, further increase the transmission power value associated with the train consist, and determine whether the further increased transmission power value is greater than the maximum output value.

The system may determine that the train consist is no longer experiencing noise interference, and restore the transmission power value to a value in effect prior to encountering the noise interference.

In various embodiments, a system for dynamically adjusting a configuration of an intra-train communication network includes an electronic device, and a computer-readable storage medium. The computer-readable storage medium includes one or more programming instructions that, when executed, cause the electronic device to receive one or more parameters values associated with a train consist, determine whether the train consist is no longer experiencing a potentially adverse condition that affected intra-train communication for the train consist based on at least a portion of the received parameters, and in response to determining that the train consist is no longer experiencing the potentially adverse condition, identifying one or more network parameter settings that were updated while the train consist was experiencing the potentially adverse condition in order to maintain intra-train communication of the train consist during the potentially adverse condition, and restoring the one or more network parameter settings to values that were in existence prior to the train consist experiencing the potentially adverse condition.

DETAILED DESCRIPTION

The following terms shall have, for purposes of this application, the respective meanings set forth below:

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

Figure 1:
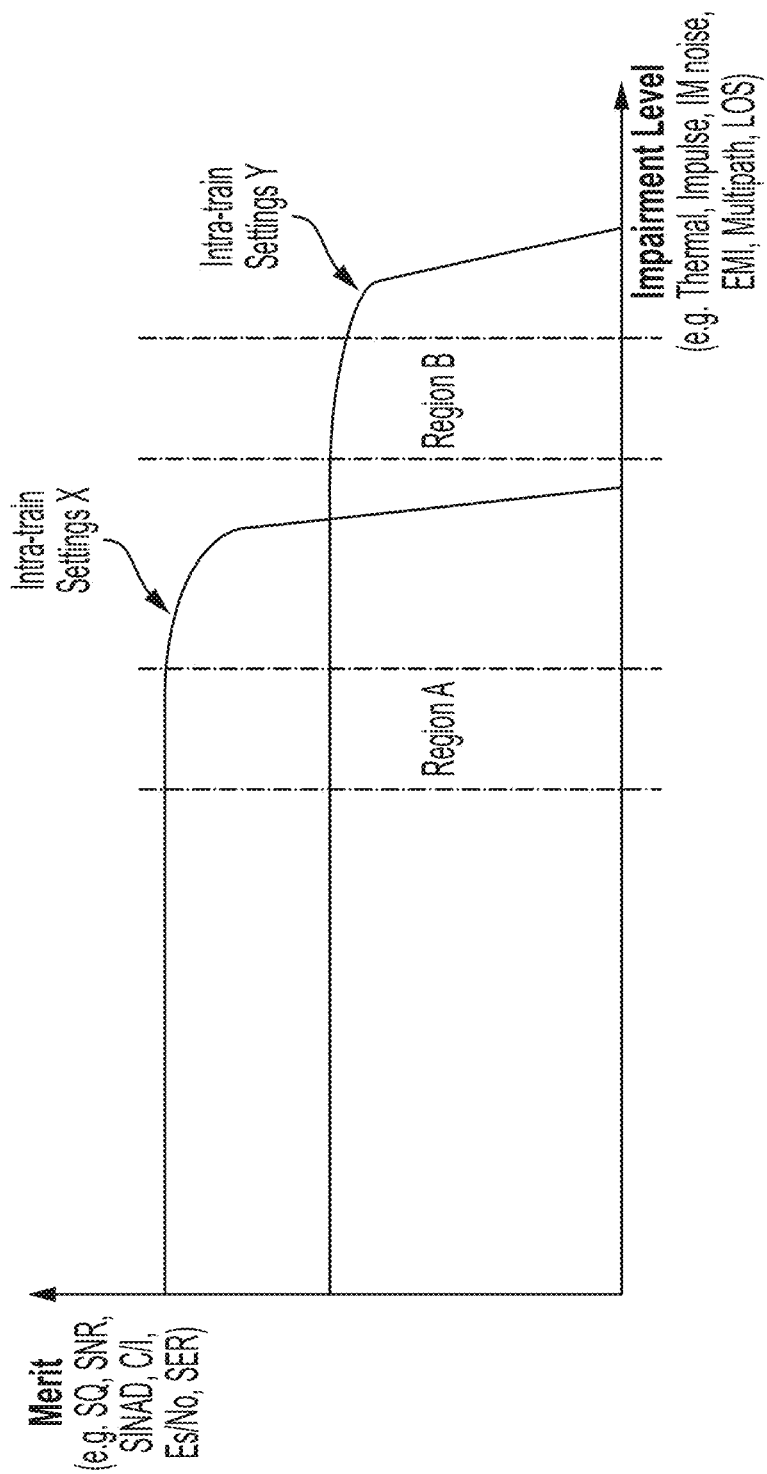
FIG. 1 is a diagram of an example autonomous intra-train communication network system settings.

The ITC network system described in this disclosure may sense, predict and/or adapt to on-coming communication impairment situations. For example, referring to FIG. 1, an autonomous ITC network system operating with performance criteria X in the environment of region A may be able to sense the on-coming of environment region B and relax performance criteria from X to Y in anticipation of on-coming environment change to maintain the network connection integrity, rather than remain at criteria X and have the network collapse when the environment changes.

Figure 2:
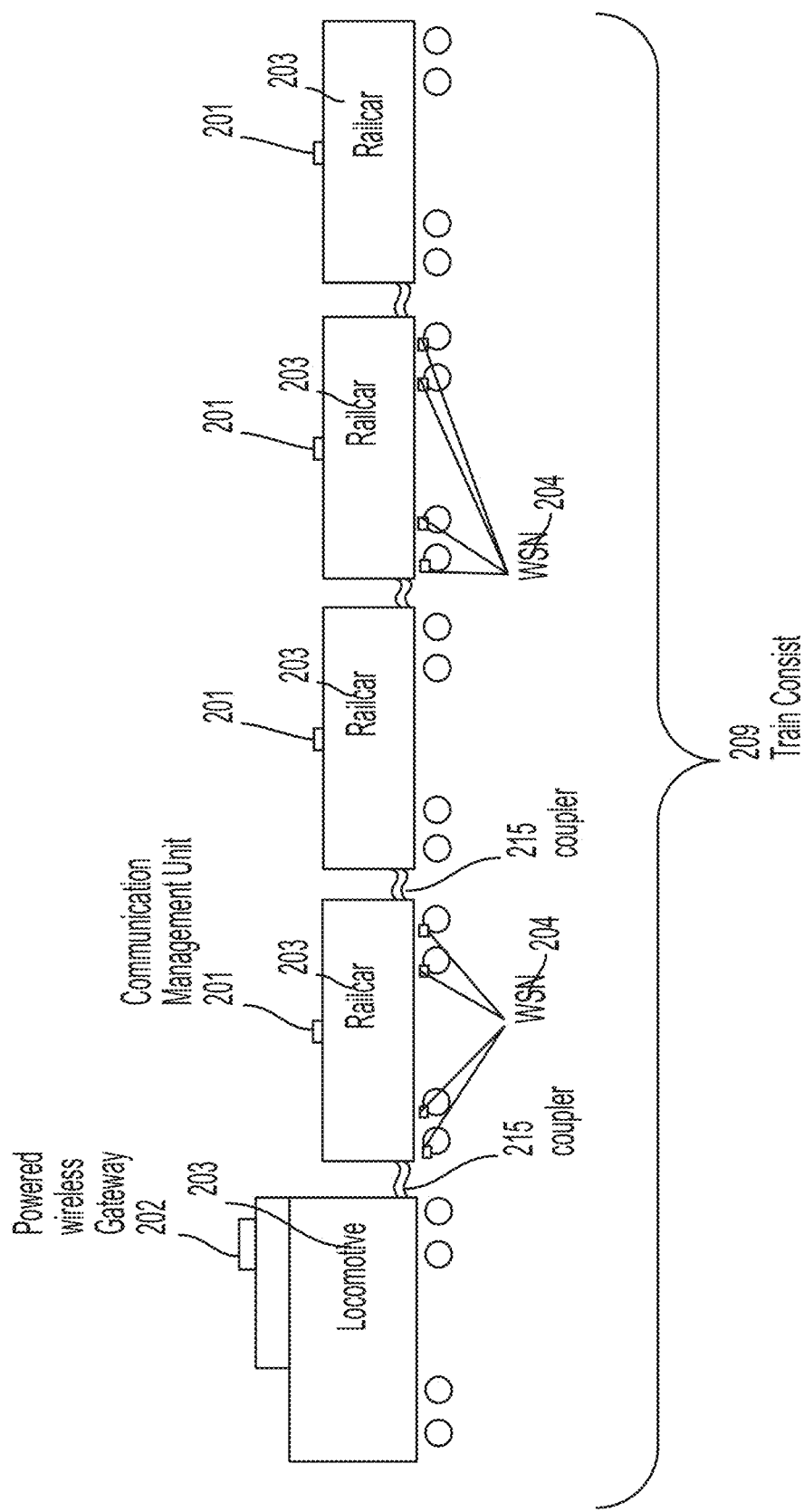
FIG. 2 illustrates an example train consist

FIG. 2 illustrates an example train consist according to an embodiment. A train consist refers to a connected group of one or more railcars and locomotives. For example, as illustrated in FIG. 2, a train consist 209 may include a locomotive 208 and one or more railcars 203. The locomotive 208 may include a powered wireless gateway 202. One or more of the railcars 203 may include one or more wireless sensor nodes (WSNs) 204 and/or a communication management unit (CMU) 201, as described in more detail below.

A WSN 204 may be located on a railcar 203. A WSN 204 may have a self-contained, protective housing, and may include one or more sensors, a power source and communication circuitry which allows the WSN to communicate with one or more other devices such as, for example, CMUs 201, a gateway 202, a remote processing device, a railroad operations center and/or the like. A WSN 204 may also include an intelligent capability to analyze the data collected from the sensors and to determine if the data needs to be transmitted immediately, held for later transmission, or aggregated into an event or alert. A WSN 204 may be used for sensing a parameter to be monitored (e.g. temperature of bearings or ambient air) or status (e.g., position of a hatch or hand brake). A WSN 204 may form part of a wireless communication network as described in more detail below. In some embodiments, a WSN 204 may include an accelerometer or other motion sensors, and/or one or more sensors to sense or measure vibrations, acceleration, centrifugal force, geography, or link margin data. A WSN 204 may include a humidity sensor, a magnetometer, a barometric pressure sensor, an atmospheric sensor and/or other sensors.

Example train and/or rail communication and sensor systems are disclosed in, for example, U.S. Pat. No. 7,688,218, issued Mar. 30, 2010, U.S. Pat. No. 9,026,281, issued May 5, 2015, U.S. Pat. No. 9,365,223, issued Jun. 14, 2016, PCT Publication WO 2015/081278, published Jun. 4, 2015, PCT Publication WO 2015/100425, published Feb. 7, 2015, and PCT Publication WO 2016/191711 published Dec. 1, 2016, U.S. Pat. No. 8,212,685, issued Jul. 3, 2012, U.S. Pat. No. 8,823,537, issued Sep. 2, 2014, U.S. Pat. No. 9,663,124, issued May 30, 2017, U.S. Pat. No. 7,698,962, issued Apr. 20, 2010, U.S. Pat. No. 9,026,281, issued May 5, 2015, U.S. Pat. No. 9,663,092, issued May 30, 2017, U.S. Pat. No. 9,365,223, issued Jun. 14, 2016, U.S. Pat. No. 9,981,673, issued May 29, 2018, and U.S. Pat. No. 10,137,915, issued Nov. 27, 2018, the full disclosures of each of these references are incorporated herein by reference in its entirety.

All WSNs 204 on a single railcar 203 may be in communication with a communication management unit 201, a PWG 202, a remote processing device, a remote railroad operations center and/or the like. Examples of WSNs 204 are disclosed in U.S. Pat. No. 9,365,223, the disclosure of which is hereby incorporated by reference herein.

A CMU 201 may be located on a railcar 203. A CMU 201 hardware may include a processor, a power source (e.g. a battery, solar cell or internal power-generating capability), and/or a global navigation satellite system ("GNSS") device which may be used to determine location, direction and/or speed of a railcar 203. Example GNSS devices include, without limitation, a global positioning system ("GPS") receiver, GLONASS, Galileo, BeiDou and/or the like. The CMU 201 hardware may include Wi-Fi, satellite, and/or cellular capability, a wireless communications capability (e.g., the presence of a communication network and/or signal strength), a compass, and, optionally, one or more sensors, including, but not limited to, a motion sensor, an impact detection sensor, an accelerometer, a gyroscope, or temperature sensor. A CMU 201 may support one or more WSNs 204 using open standard protocols, such as the IEEE 2.4 GHz 802.15.4 radio standard.

In various embodiments, a CMU may include a magnetometer to associate railcar orientation with set and measured train consist parametrics. The magnetometer may have the north and south polarity points aligned with the coupler ends of each railcar during device installation. This is to assist with train consist configuration during yard management as some rail cars have ingress/egress points for the transported asset on only one side or in one vehicle area, making alignment critical for sequential train consist loading and unloading, assembly and disassembly activities in a rail yard.

CMUs 201 may communicate wirelessly with a PWG 202, or may be configured to communicate through a wired connection, for example, through the ECP (electronically controlled pneumatic) brake system. In various embodiments, a CMU 201 may communicate with a remote processing device or a remote railroad operations center. A CMU 201 may include a global navigation satellite system (GNSS) device which may be used to determine location, direction and/or speed of a railcar 203. Types of GNSS receivers include, without limitation, GPS sensors, GLONASS, Galileo, BeiDou, and/or the like.

A CMU 201 may be capable of receiving data and/or notifications (e.g., alerts or alarms) from one or more WSNs 204 and is capable of drawing inferences from this data or notifications regarding the performance of railcar 203, and of transmitting data and notification information to a remote receiver, remote processing device and/or remote railroad operations center. A CMU 201 may be a single unit that would serve as a communications link to other locations, such as a mobile base station (e.g., the locomotive 208), a land-based base station, etc., and have the capability of processing the data received.

A PWG 202 may be located on a locomotive 208 or deployed remotely from a train consist or in a railyard. A PWG may include a processor, a GNSS device, a communication device such as, for example, a satellite and or cellular communication system, local wireless transceiver (e.g. WiFi), an Ethernet port, a high capacity mesh network manager or other means of communication, and/or a gyroscope. The PWG 202 may have power supplied by the locomotive 208, if located on a powered asset, such as a locomotive, or will derive its power from another source, for example, from a solar power generator or from a high-capacity battery.

Figure 3:
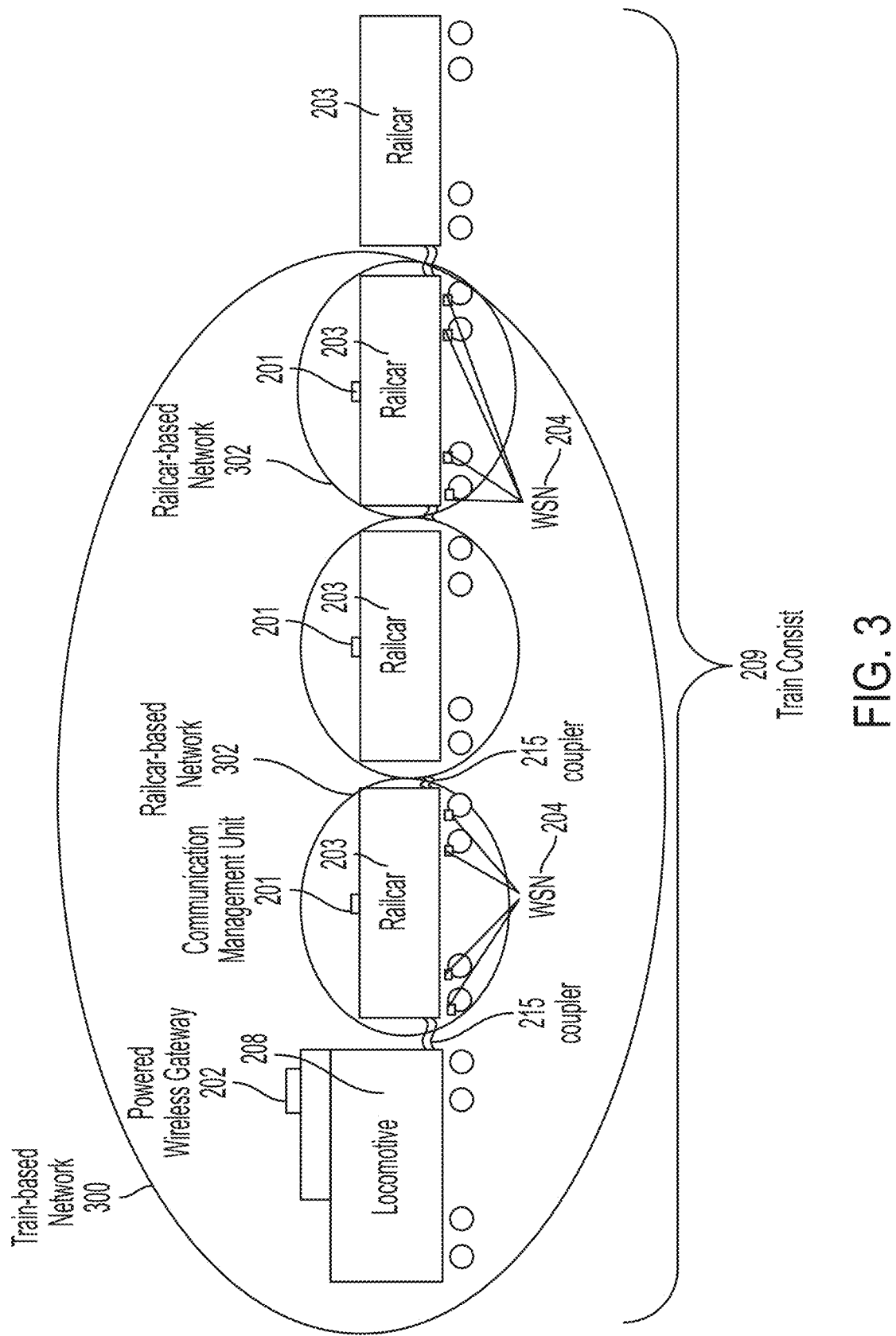
FIG. 3 illustrates examples of various types of networks.

In various embodiments, one or more networks may be used to facilitate communication within a train consist, or between a train consist and a remote device, system or location. It is understood that any suitable type of network may be used within the scope of this disclosure, including, without limitation, those described below in reference to FIGS. 14A-14C. FIG. 3 illustrates examples of various types of networks according to various embodiments.

In an embodiment, a railcar-based network 302 may include a CMU 201 installed on a railcar 203 and one or more WSNs 204 installed on the same railcar. All WSNs 204 on a single railcar 203 may form a railcar-based network 302 that is controlled by a CMU 201. A CMU 201 may support one or more WSNs 204 in a network configuration using open standard protocols, such as the IEEE 2.4 GHz 802.15.4 radio standard.

Additionally, a CMU 201 may also be a member of a train-based network 300, which may include the CMUs 201 from all enabled railcars 203 in the train consist 209, controlled by a PWG 202, typically located on a locomotive 208 or is a member of a rail yard-based network, controlled by one or more powered wireless gateways dispersed throughout the rail yard.

A CMU 201 may support at least the following four functions: 1) to manage a low-power railcar-based network 302 overlaid on a railcar 203; 2) to consolidate data from one or more WSNs 204 in the railcar-based network 302 and to apply logic to the data gathered to generate warning alerts to a host such as a locomotive 208 or remote railroad operations center; 3) to support built-in sensors, such as an accelerometer, within the CMU 201 to monitor specific attributes of the railcar 203 such as location, speed, accelerations and more; and 4) to support bi-directional communication upstream to the host or control point, such as a locomotive 208 and/or an off-train monitoring and remote railroad operations center, and downstream to one or more WSNs 204, located on the railcar. CMUs 201 may communicate wirelessly to the PWG 202 in a network configuration, or may be configured to communicate through a wired connection, for example, through the ECP (electronically controlled pneumatic) brake system. Those skilled in the art will appreciate that GPS is just one form of a global navigation satellite system (GNSS). Other types of GNSS include GLONASS, Galileo, and BeiDou with others in development. Accordingly, although GPS is used in the embodiments described herein, any type of GNSS system or devices may be used.

A PWG 202 may control a train-based network 300 overlaid on a train consist 209, consisting of multiple CMUs 201 from each railcar 203 in a train consist 209, isolated CMUs 201 that are not part of a train consist, or a rail yard-based network overlaid on a rail yard, consisting of land-based PWGs and CMUs from individual railcars not currently associated with a train consist 209.

In an embodiment, a train-based network 300 is overlaid on a train consist 209 and is comprised of a PWG 202 installed on a host or control point such as a locomotive 208, or on another asset with access to a power source, and one or more CMUs 201, each belonging to the train-based network 300 and to their respective railcar-based networks 302, if one or more WSNs 204 are present, or respective railcar-based networks 302 for railcars with a CMU 201 but no WSNs. Thus, here, CMUs 201 can belong to two networks, railcar-based network 302 (if railcar 203 is fitted with one or more WSNs 204) and train-based network 300. Each CMU 201 is also optionally managing its respective railcar-based network 302. The railcar-based network 302 is continually monitored by the CMU 201 and is optimized for the ever changing wireless environment that a moving railcar 203 experiences. Train-based network 300 uses an overlay network to support low-power bi-directional communication throughout train consist 209 and with PWG 202 installed on locomotive 208 or distributed on a railcar in a train consist. The overlaid network 300 is composed of wireless transceivers embedded in the CMU 201 on each railcar 203. Each CMU 201 is capable of initiating a message on the train-based network 300 or relaying a message from or to another CMU 201 or from a WSN 204. The overlay train-based network 300 is created independently of, and operates independently of the railcar-based networks 302 created by each railcar 203 in the train consist 209.

A bi-directional PWG 202 manages the train-based network 300 and communicates notifications or events (e.g., alerts or alarms) from the CMUs 201 and/or WSN 204 installed on individual railcars 203 to the host or control point, such as the locomotive 208, where the notifications may be acted upon via human intervention, or an automated system. Locomotive 208 may include a user interface for receiving and displaying notification messages generated by the train-based network 300. Bi-directional PWG 202 is capable of receiving multiple alerts, events or raw data from WSNs 204 through CMUs 201 on individual railcars 203 and can draw inferences about specific aspects of the performance of train consist 209.

In an embodiment, a distributed complex event processing (DCEP) engine may be used. A DCEP engine refers to a hierarchical system for collecting and analyzing data and for communicating data and/or notifications to a final destination where they can be acted upon. The DCEP engine may be responsible for implementing the intelligence used to draw conclusions based on the data collected from WSNs 204, CMUs 201 and/or PWGs 202. The DCEP engine may be distributed among all or a portion of the WSNs 204, CMUs 201 and the PWG 202 on the locomotive 208, as well as utilizing a cloud-based infrastructure optimized to work closely with train-based networks, in conjunction with a variety of data streams from third-party providers or external sources.

If an alert or event condition is detected by a WSN or other sensor, such as when broken track or rough/choppy track is encountered, as described in more detail below, the WSN 204 may forward a message to the CMU 201 within its network for further analysis and action. For example, to confirm or coordinate alert or event conditions reported by one WSN 204 with other WSNs 204 in the railcar based network. If an event requiring notification is confirmed by CMU 201, a notification of the event may be sent to the PWG 202 installed on an asset such as the locomotive 208, and/or off train to a remote processing center and/or remote railroad operations center.

The bi-directional PWG 202 may be capable of exchanging information with an external remote railroad operations center, data system or other train management systems. This communication network, such as the network 400 shown in FIG. 4, may include cellular, LAN, Wi-Fi, Bluetooth, satellite, or other means of communications. This link may be used to send notifications of events and alarms off-train when the train consist is in operation. This link may also be used to send instructions and information from the remote railroad operations center or other off train source to the individual railcar CMU 201, such as updated geofence coordinates to be used by the CMUs 201 when determining if a discharge gate related event has occurred.

A notification may provide information for inter alia, operations and security. The notification may include location of the event, time of the event, status of the event, duration of the event and alerts.

The term notification may include any information such as alarms, alerts, event details, and data communicated by the CMU 201, WSN 204 and/or PWG 202 for the purpose of notifying persons or other systems of the information. The notification event may be communicated immediately or at some future time depending on the urgency and/or criticalness of the event.

Figure 4:
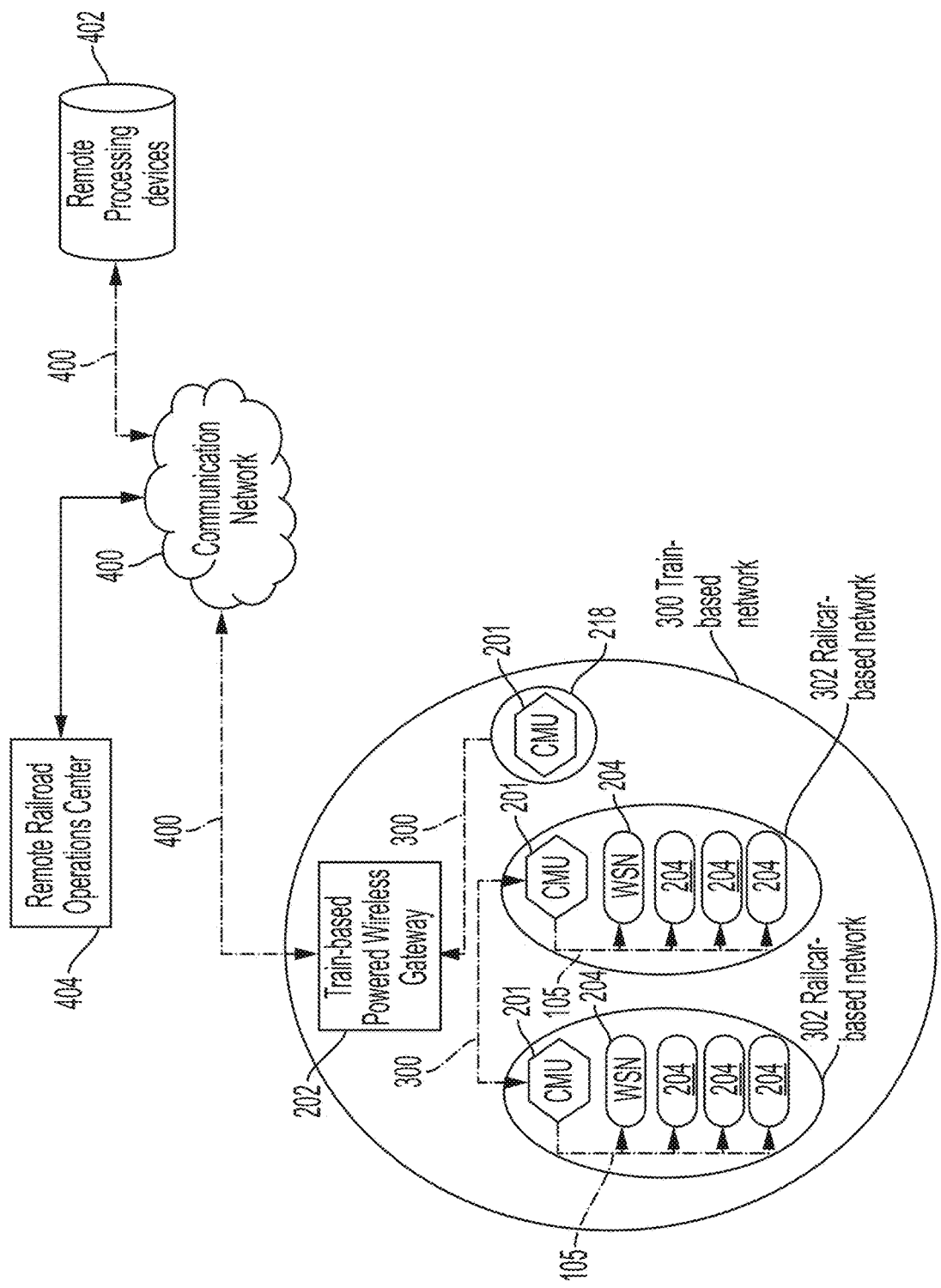
FIG. 4 illustrates an example communication system according to an embodiment.

FIG. 4 illustrates an example rail yard communication system according to an embodiment. As illustrated by FIG. 4, a PWG may be in communication with one or more remote processing devices 402 for example, one or more servers, via a communication network 400. In an embodiment, a PWG may be in communication with a remote railroad operations center 404 via a communication network 400. A communication network 400 may include, without limitation, cellular, LAN, Wi-Fi, Bluetooth, satellite, or other means of communications. Although FIG. 4 illustrates communication between a PWG and one or more remote processing devices 402 and/or a remote railroad operations center 404, one or more CMUs and/or WSNs may communicate directly with one or more remote processing devices 402 and/or a remote operations center 404 via one or more communication networks.

In an embodiment, a remote processing device may maintain a machine learning model that it may use to predict one or more network adjustments, as discussed in more detail below. An on-board system may measure stimuli that either affects communication integrity or exceeds one or more specified threshold values, and may report one or more detected occurrences to a machine learning model for consideration. The machine learning model may, in turn, perform one or more of descriptive analytics (e.g., "what has happened?"), predictive analytics (e.g., "what could happen?") and/or prescriptive analytics ("what should we do?").

Figure 5A:
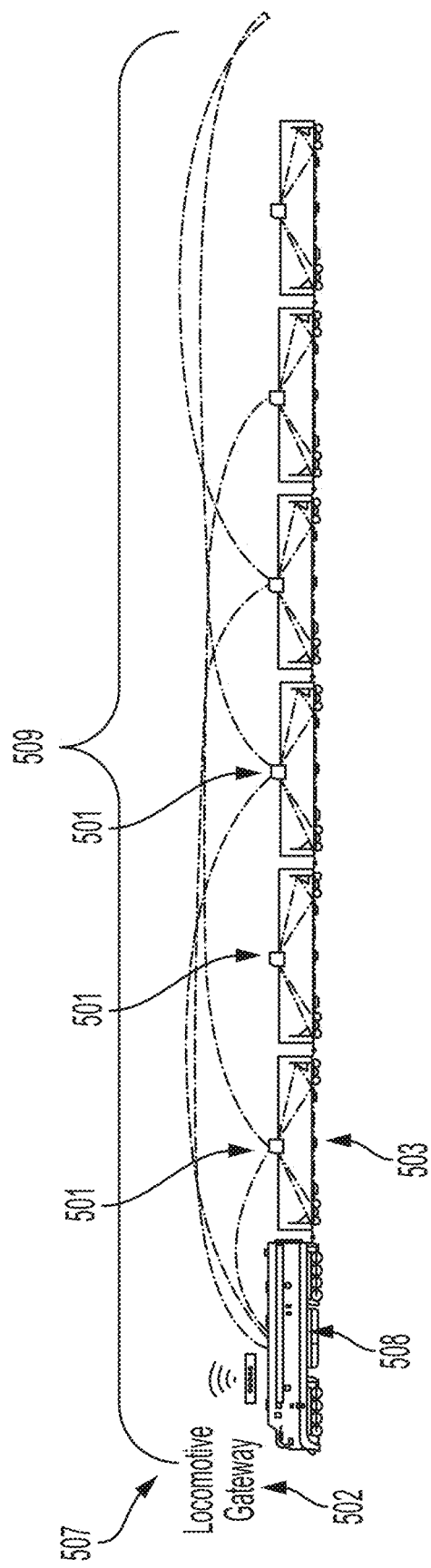
FIGS. 5A and 5B are diagrams illustrating example communication hops across a train consist.
Figure 5B:
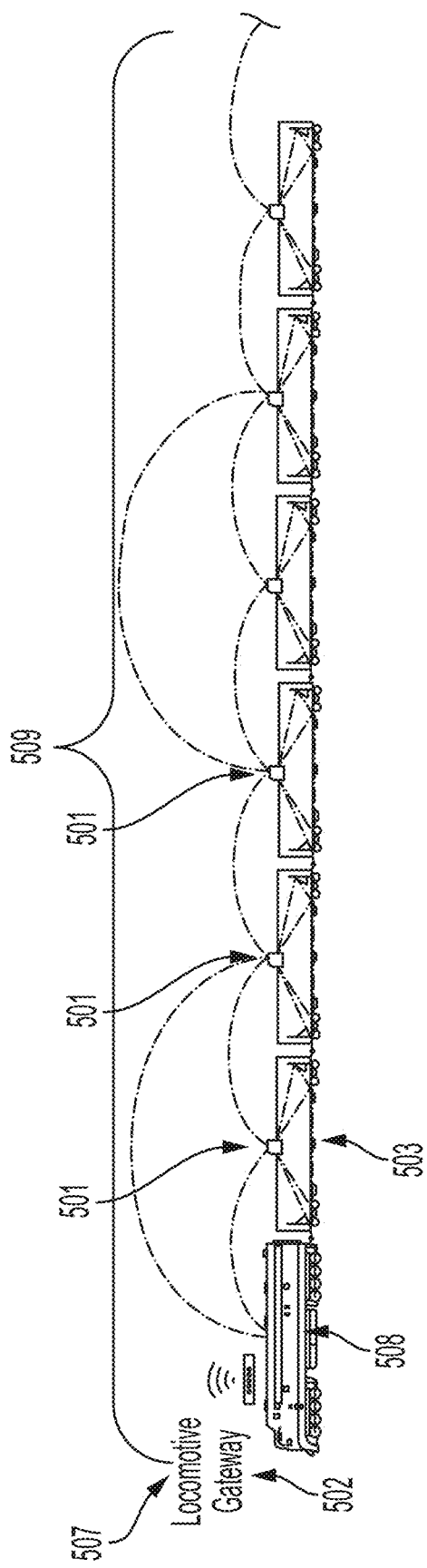

FIGS. 5A and 5B illustrate an example ITC network system according to various embodiments. As illustrated in these figures, a train-based network 507 may use a wireless network to provide bi-directional communication from one or more railcars 503 in a train consist 509 to a host or control point, such as, for example a locomotive 508.

A PWG 502 may be utilized to manage the network 507 and to communicate information, such as notifications, alarms, or alerts, from individual railcars 503 to the locomotive engineer or an off-train management systems. The PWG 502 may be configured to receive information from different railcars 503, and making an inference about performance of the train consist 509. For instance, a PWG may make certain determinations about accelerations, decelerations, impacts and alarm or alert transmissions when a train is in motion.

A CMU 501 on a railcar 503 may be capable of being a wireless node in the train-based network 507 and may be capable of sending messages to a locomotive 508 host or control point. For example, a CMU 501 may store data or information that it may send to a remote processing device through a communications network. A CMU 501 may be capable of using built-in sensors and/or managing a WSN 504 network on the railcar 503 to generate messages to be sent to locomotive 508 host or control point.

In an embodiment, a train or railcar network may begin to form when a network manager (e.g., a PWG for a train network, a CMU for a railcar network) begins sending "advertisements" or packets that contain information that enables a device to synchronize to the network and request to join. This message exchange is part of the security handshake that establishes encrypted communications between the manager and mote (e.g, a CMU for a train network, or a WSN for a railcar network). The network manager may set the number of desired parents for each mote ensuring the existence of redundant communication paths. An ongoing discovery process ensures that the network continually discovers new paths as the radio conditions change. As segments of the communication path become unavailable (e.g., due to climate, environment, malfunction, etc), the network is able to re-optimize and heal itself by employing the redundant and/or newly discovered radio paths.

Figure 6:
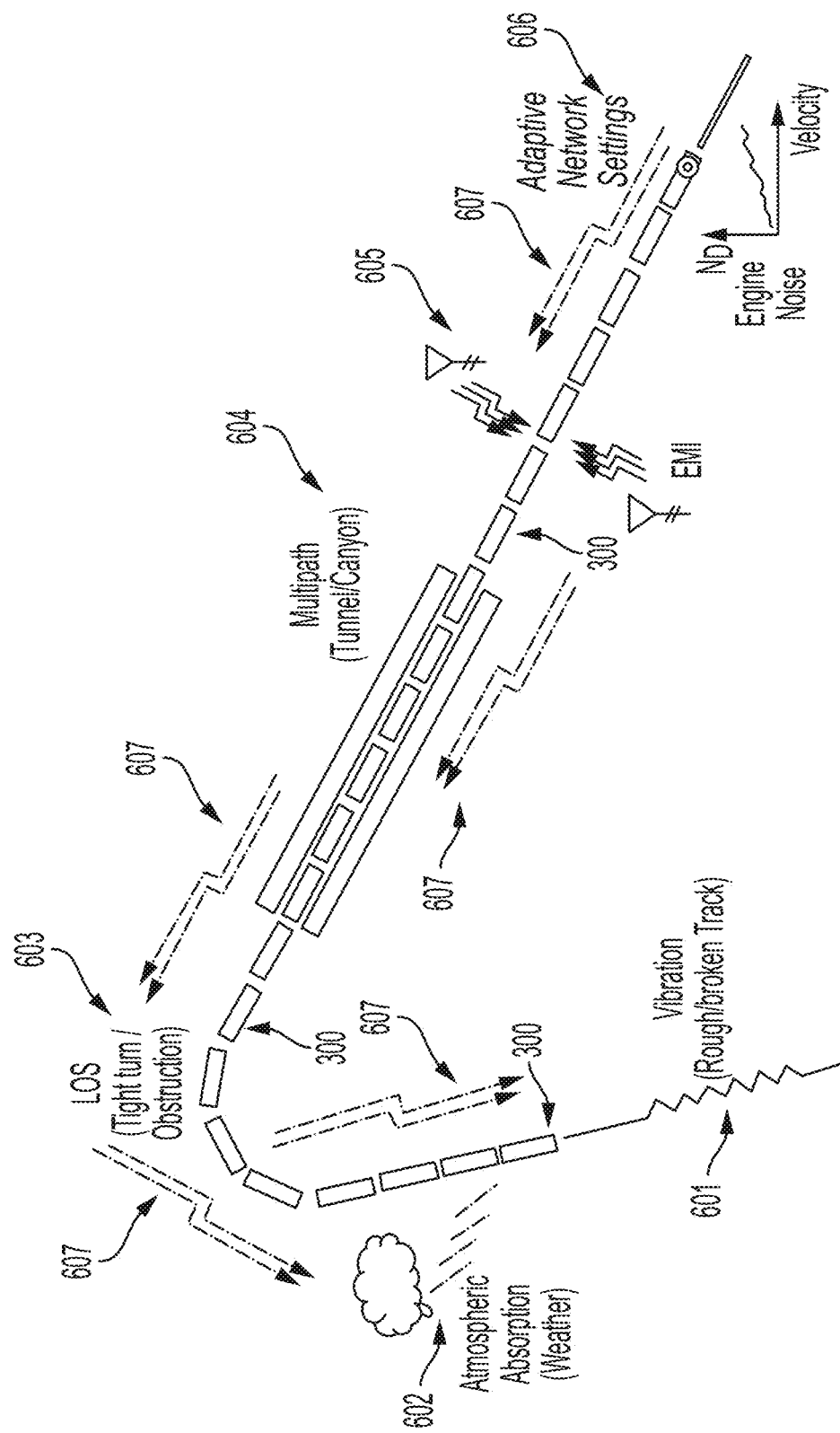
FIG. 6 illustrates example intra-train communication network settings as a train consist progresses through various potentially adverse conditions which may affect intra-train communication.

FIG. 6 illustrates example ITC network settings as a train consist progresses through various potentially adverse conditions which may affect ITC. As described throughout this disclosure, potentially adverse conditions may include, without limitation, tight turns, broken track, rough track, track subsidence, weather-related events which may interfere with network communication (e.g., atmospheric interference), inter-symbol interference, noise interference, and/or the like.

Acceleration forces resulting from adverse conditions, such as tight turns or rough track, may affect railcars in a train consist differently depending on the load profile of the railcar or the type of railcar. Further, the same forces may cause the ITC network to experience interruptions due to loss of line-of-sight, or network dropouts due to sudden peak vibration. FIG. 6 illustrates example adverse conditions, including, without limitation, vibration caused by rough/broken track 601, atmospheric interference and/or signal absorption 602, loss of line-of-sight ("LOS") due to tight turns or obstruction 603, multipath issues related to tunnel/canyon/urban environments 604, electromagnetic interference 605, and the like. In an example implementation, adaptive network settings 606 may be adapted and propagated using signals 607 throughout the consist 600 to compensate for these conditions.

Various sensors may collect data about environmental conditions that are experienced by a train consist, and this data may be analyzed to dynamically adjust a configuration of an ITC network by generating and implementing updated adaptive network settings, for example, adaptive network settings 606 of FIG. 6. A machine learning model may be utilized for this purpose.

In various embodiments, a machine learning model may employ descriptive analytics. For instance, a machine learning model may use data aggregation and data mining to provide insight and develop learning algorithms and assess forecast techniques. A machine learning model may employ predictive analytics, which may use statistical models, learning algorithms and/or forecast techniques to provide insights about the likelihood of a future outcome. In an embodiment, a machine learning model may employ prescriptive analytics, which may use optimization and simulation algorithms to quantify the effect of future decisions in order to advise on possible outcomes before the decisions are actually made.

A machine learning model may, for example, associate drops in link margin with track geography and centrifugal data. A machine learning model may implement one or more algorithms to associate various types of data, for example, centrifugal force and geographic data. For example, one or more algorithms may be used to associate body mount acceleration data with full, partially empty loaded railcars with track geography and centrifugal data, and/or associate body mount acceleration data with track geography and centrifugal data.

In various embodiments, one or more machine learning models may be used to adjust train consist ITC network parameter settings (e.g. hop distance, RSSI or Link Margin threshold $LM_{th}$, parent/child settings) to maintain communication system integrity through the adverse environmental conditions, as described in more detail below. Network parameter settings may traverse through the train consist in a method analogous to the way mechanical compression and expansion transverse through a slinky.

In an embodiment, a processing device (e.g., a CMU), may aggregate information, such as parameters or settings, from one or more train consists and use this information to train a machine-learning model. In this way, the processing device may better predict optimized settings for a train consist that experiences one or more adverse conditions in order to better preserve network integrity connectivity. For example, a processing device may aggregate information from multiple train consists that travel the same route, or a portion of the same route, and use this information to better train one or more models.

In an embodiment, a machine-learning model may use historical sensor data, external information, and/or historical network data to make one or more determinations, as discussed throughout this disclosure. Historical sensor data may refer to information that was measured or obtained by a railcar and/or train consist from a historical trip. Examples of historical sensor data include, without limitation, information measured or obtained from one or more sensors (e.g., accelerometer, gyroscope, temperature sensor, humidity sensor, etc.), environmental condition information, various threshold levels, and/or the like.

External information refers to data received from sources external to a train consist such as, for example, data feeds or other information pertaining to track route information, track mapping information, car location messages (CLM), terrain information, weather reports and/or the like. In an embodiment, external information may be acquired through one or more data feeds from sources that, while potentially dynamic in nature, are not dependent on environmental conditions surrounding a train consist.

Historical network data may include, for example, one or more network parameter values from one or more historical trips of one or more train consists. Examples of historical network data may include, without limitation, hop distance values, link margin values, power transmission values and/or the like. In various embodiments, at least a portion of historical sensor data and historical network data may be stored by a data store of a train consist, such as, for example, one present on a PWG. Additionally and/or alternatively, this information may be stored by a remote processing device in communication with a train consist.

Figure 7:
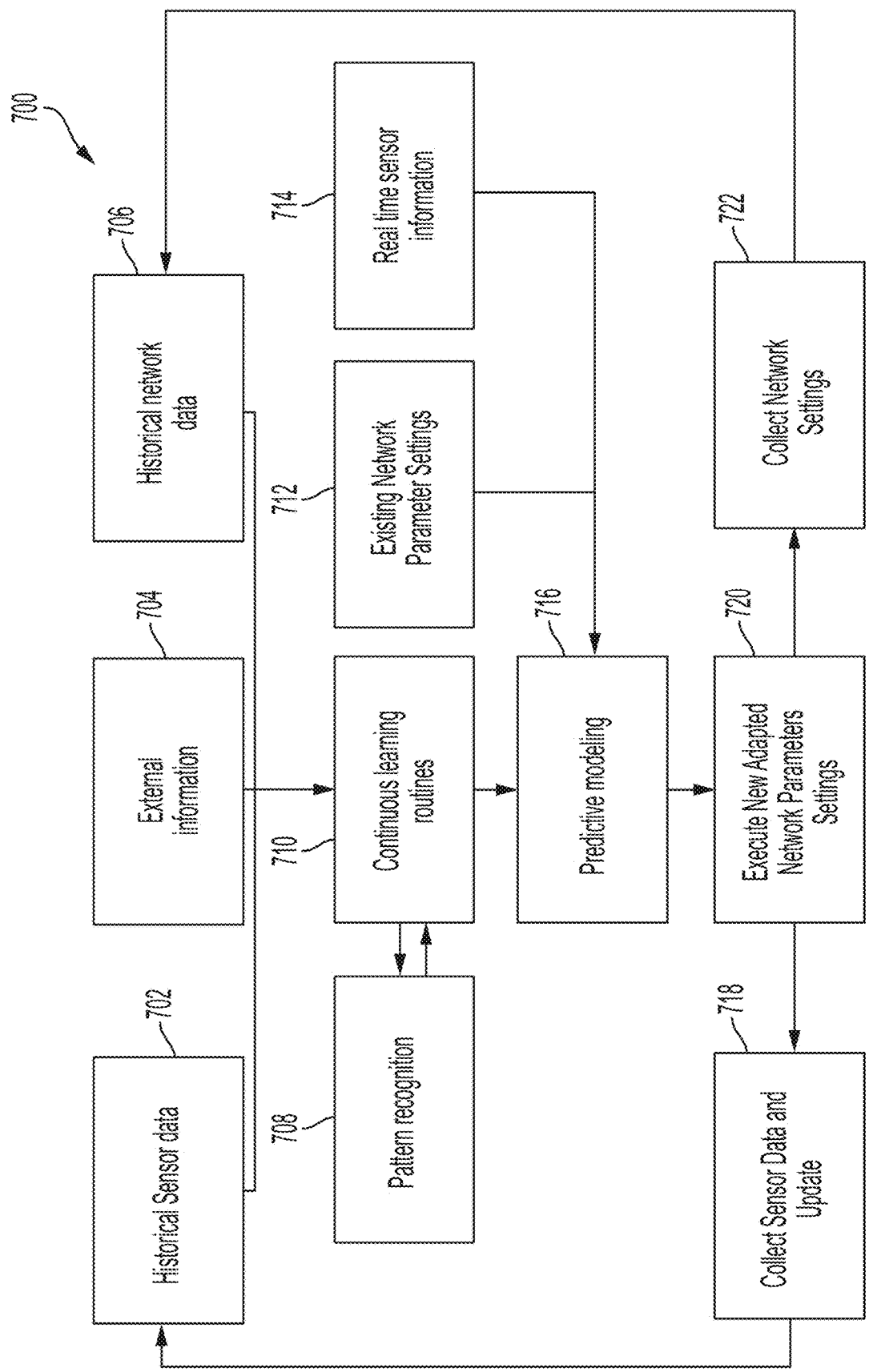
FIG. 7 illustrates an example process applying an intra-train communication machine learning model.

FIG. 7 illustrates an example process applying an ITC machine learning model according to an embodiment. As illustrated by FIG. 7, historical data 702, external information 704, and historical network data 706 may be processed by one or more continuous learning routines 710 of a model. Continuous learning routines 710 may be, for example: dimensionality reduction, ensemble learning, meta learning, enforcement learning, supervised learning (e.g., Bayesian, decision tree algorithms, linear classifier), unsupervised learning (e.g., artificial neural networks, association rule learning, hierarchical clustering, cluster analysis, anomaly detection), semi-supervised learning, deep learning, and/or the like.

Pattern recognition 708 may be performed on the data to identify repeating patterns in the data. For example, historical sensor data and external information may show that at a particular point in a route, or at a particular set of GNSS coordinates, a particular type of electromagnetic interference is observed or a repeated vibration caused by a rough track is observed. By referencing historical network parameter settings 706, the continuous learning process may systematically determine the optimum network parameter settings and proactively apply those settings as the particular point is approached. In another example, a new building may be erected near a bend of a train track in an urban location. The corresponding signal obstruction is observed in historical data 702 and the continuous learning algorithm may systematically and methodically revise the network parameter settings to locate the optimum settings.

This information, after pattern recognition processing 708, may be combined with existing network parameter settings 712 and real time sensor data 714 and predictive modeling 716 may be performed. Real-time sensor data may be data that is dependent on the location and/or environmental conditions surrounding a train consist, such as, for example, temperature, humidity, acceleration, weather reports and current location. Predictive modeling 716 may take the real time sensor information 714 and compare it to patterns that have been previously experienced by the train consist (or other train consists) and analyzed by continuous learning routines 710. Predictive modeling 716 may then adjust the existing network parameter settings 712 to generate new adapted network parameter settings 720. Sensor data may be collected 718 and historical sensor data 702 may be updated. Network settings may be collected 722 and historical network parameter settings 706 may be updated.

In an embodiment, a machine-learning model may include a historical data store. A historical data store may be a database, table or other data structure that may store information about one or more journeys made by one or more train consists and/or railcars of a train consist in the past. Such information may include measurements obtained during the journey at certain points in time such as, for example, centrifugal force, acceleration, vibrations, temperature, humidity, and/or the like. Such information may include geographical location information at certain points in time such as coordinates or other position or location information. It is understood that additional or alternate information may be maintained by a historical data store according to this disclosure. In an embodiment, a historical data store may be continually updated as it receives data.

A machine-learning model may be maintained by a processing device that is remote from a train consist such as, for example, a remote server or a cloud-based server in communication with one or more train consists. In this way, the processing device may compile and aggregate data and information across a fleet of rail vehicles. A local copy of a machine-learning model may be stored by one or more train consists. For example, a PWG of a train consist may store a local copy of a machine-learning model. As such, a PWG may perform certain determinations when the train consist is not in communication with a remote processing device.

In various embodiments, a remote processing device may send one or more updates or updated machine-learning models to one or more train consists. For example, if a train consist has been out of communication with a remote processing device for a period of time, the remote processing device may determine whether the local copy of a machine-learning model stored by the train consist is up-to-date or if any updates were made to the model while the train consist was out of touch. If the processing device determines that one or more updates were made, it may send those updates (or the updated model) to the train consist when the train consist is in communication with the remote processing device so that the train consist can replace its current version of the model with the updated model.

Figure 8:
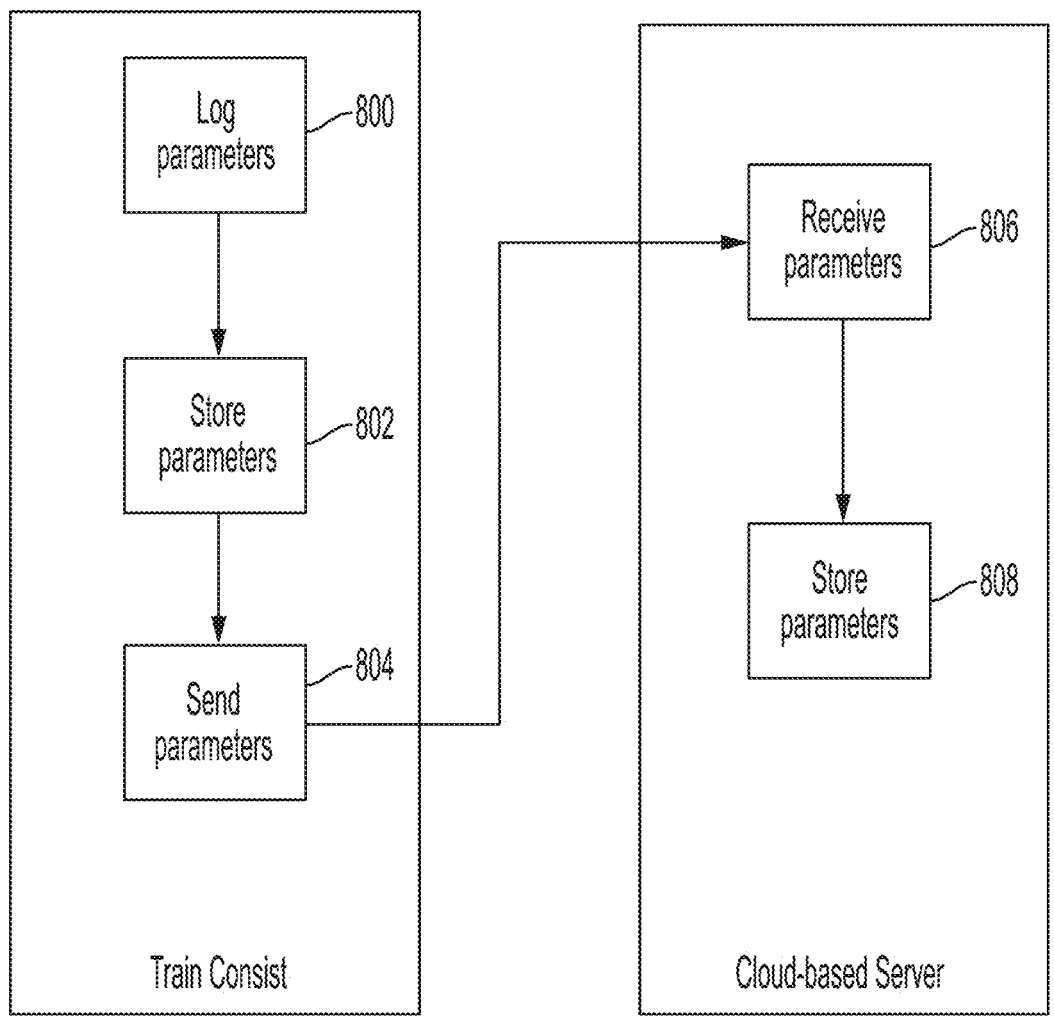
FIG. 8 illustrates a flow chart of an example method of updating a machine-learning model for one or more train consists.

FIG. 8 illustrates a flow chart of an example method of updating a machine-learning model for one or more train consists according to an embodiment. As illustrated in FIG. 8, one or more train consists may log 800 one or more parameters.

A train consist may store 802 the parameters it logs in a local data store, such as, for example, a data store of a PWG. A train consist may send 804 at least a portion of the stored parameters to a remote processing device. A train consist may send 804 parameters to a remote processing device at regular intervals or periodically. Alternatively, a train consist may send 804 parameters to a cloud-based server upon request. The cloud-based server may receive 806 the parameters from the train consist, and store 808 the parameters in a data store associated with the cloud-based server.

In various embodiments, the cloud-based server may receive parameters from a number of different train consists with which it communicates. The cloud-based server may compile and store these parameters to provide a more comprehensive data set across consists. The cloud-based server may use the received parameters to update or train one or more machine-learning models maintained by the cloud-based server. In various embodiments, a machine learning method may be trained from decision trees, support-vector machines, neural networks, logistic regression, or any other supervised, unsupervised and/or reinforcement machine learning method (or combination thereof), or other techniques as a person of skill in the art will understand, such as those discussed above or other similar processes and algorithms from machine learning.

The present disclosure describes systems and methods of monitoring and adapting the performance of an ITC network to account for various potentially adverse conditions that a train may encounter during travel. A potentially adverse condition refers to a condition or situation that may affect the quality of ITC of a train consist. Examples of such potentially adverse conditions include, without limitation, tight turns, rough track, broken track, track subsidence, environmental interference such as weather-related events (e.g., humidity, rain, atmospheric conditions, temperature, moisture, etc.), inter-symbol interference, noise interference, and/or the like.

Various parameters may be measured by various sensors of a train consist as the train consist navigates a route. These parameter values (or a portion thereof) may be used, along with one or more historical parameter values to determine whether a potentially adverse condition may occur. Historical parameter values may be ones associated with a previous trip or navigation of at least a portion of the same route, either by the same train consist or by one or more other consists. If a potentially adverse condition is detected, one or more updated network parameter settings may be identified which may assist in maintaining ITC of the train consist during an occurrence of the detected or anticipated potentially adverse condition. In various embodiments, one or more updated network parameters may be determined using one or more machine learning models, as discussed in more detail below. One or more of the updated network parameter settings may be implemented.

Figure 9:
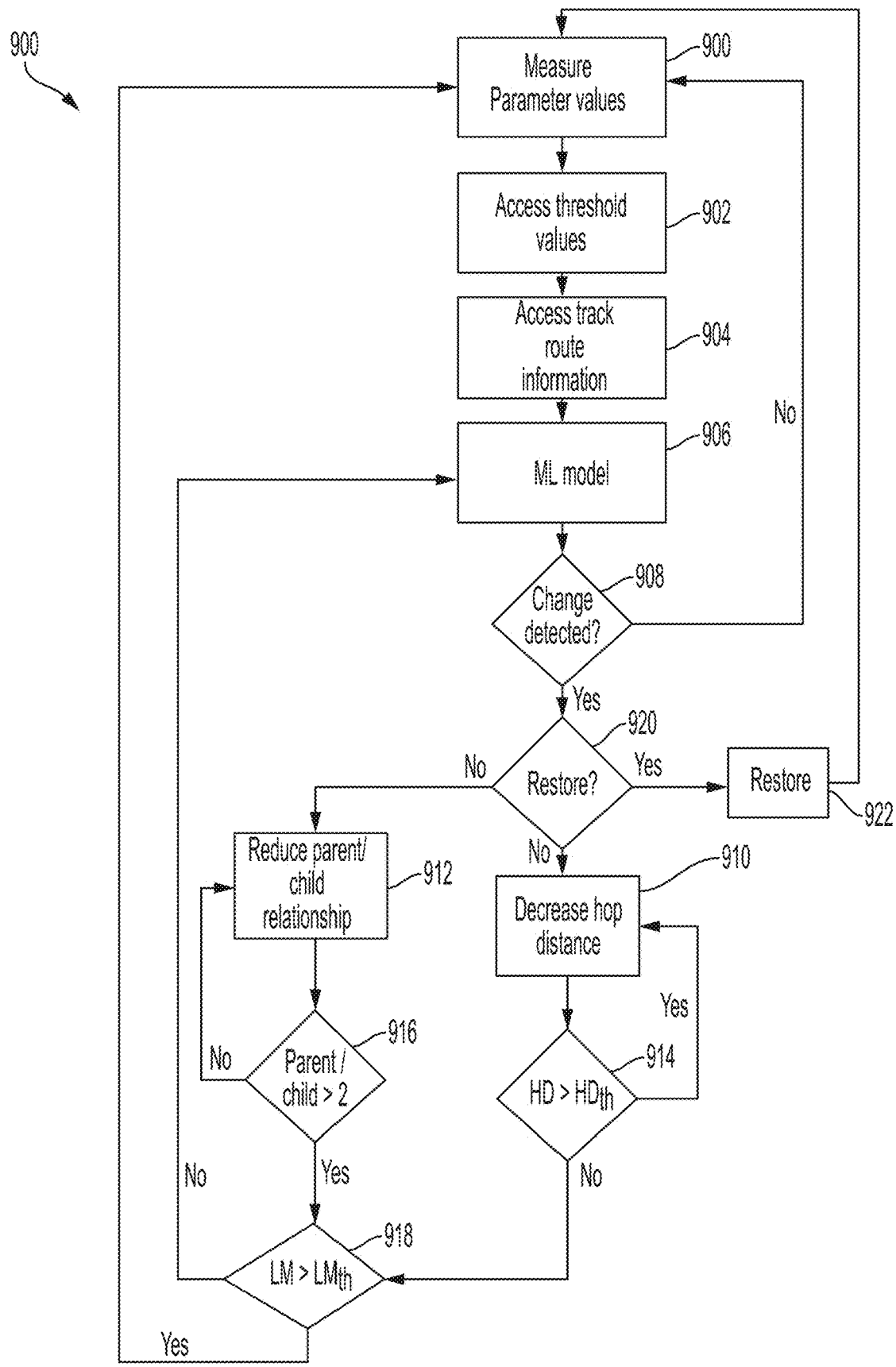
FIG. 9 illustrates an example implementation for processing tight turns.

FIG. 9 illustrates an example implementation for processing tight turns according to an embodiment. As illustrated by FIG. 9, a train consist (e.g., a gyroscope of a train consist) may measure 900 a centrifugal force value (F), an angular acceleration value ($\omega$), and/or a time duration value (t) associated with F and/or $\omega$. A centrifugal force value and/or an angular acceleration value may represent those values at a particular point in time. A time duration value may represent a total duration a measurement.

A train consist may access 902 one or more threshold values according to an embodiment. In an embodiment, a data store, such as a data store associated with the train consist, may store one or more threshold values for various parameters, measurement variables and/or network metrics associated with the train consist. For example, threshold values associated with a threshold centrifugal force ($F_{th}$), a threshold angular acceleration ($\square_{th}$), a threshold time duration ($t_{th}$), a threshold link margin ($LM_{th}$), and a threshold hop distance ($HD_{th}$) may be stored.

Link margin refers to the difference between a receiver's sensitivity and a minimum expected received power of a signal, or the amount of signal that can be attenuated before the receiver will fail to receive the signal. Hop distance refers to the distance in a network between two communicating nodes. Decreasing hop distance effectively means connecting to nodes that are closer, and which have a correspondingly higher signal strength. In various embodiments, a PWG may be able to ascertain a current hop depth from a communication received from a railcar. For instance, a PWG may be able to use information from the received message to determine how many hops the message made to reach the PWG. In an embodiment, a PWG may use the individual mote-to-mote path link margin calculations to maximize associated mote-to-mote hop distances (HD) and extend the train network to cover the length of the train consist in a minimal number of radio hops.

A mote refers to a device that is capable of performing data processing and/or collecting sensory information. In an embodiment, a mote may provide wireless communication functionality for one or more devices to transmit sensor or other data. For example, a mote may provide wireless communication functionality for a WSN for a railcar network or a CMU for a train network. A network may include self-forming multi-hop motes, which may collect and relay data, and a network manager that monitors and manages network performance and/or security and exchanges data with a host application. In a train network, a network manager may be a PWG. In a railcar network, a CMU may be a network manager.

In a wireless communication system, a link margin (LM) refers to the difference between the receiver's sensitivity and the expected minimum received power. For example, a receiver's sensitivity may be the received power at which the receiver will stop working or effectively stop working. As an example, a 10 dB link margin may indicate that the system could tolerate an additional 10 dB of attenuation between the transmitter and the receiver, and it would still just barely work.

Link margin may be described by the following:

$$LM = P_{RX} - S_{RX}$$

where:
LM=Link Margin (dB)
$P_{RX}$=received power (dBm)
$S_{RX}$=receiver sensitivity threshold (set value defined by hardware design) (dBm)
LM>$LM_{th}$ (set value defined by system analysis, e.g. 10 dB)
such that:

$$P_{RX} = P_{TX} + G_{TX} + L_{TX} - L_{FS} - L_{misc} + G_{RX} - L_{RX}$$

where:
$P_{RX}$=received power (dBm)

$P_{TX}$=transmitter output power (dBm)
$G_{RX}$=transmitter antenna gain (dBi)
$L_{TX}$=transmitter losses (traces, coax, connectors ...) (dB)
$L_{FS}$=free space loss (dB)
$L_{misc}$=miscellaneous losses (fading margin, body loss, polarization mismatch, other losses ...) (dB)
$G_{RX}$=receiver antenna gain (dBi)
$L_{RX}$=receiver losses (traces, coax, connectors ...) (dB)

In an embodiment, a train consist may access 902 one or more threshold values by retrieving them from the data store.

In an embodiment, a train consist may access 904 track route information. Track route information may include known information about a train consist's anticipated route such as information pertaining to known adverse conditions, historical travel information by this train consist or other train consists across the same route and/or the like. In various embodiments, track route information may be stored by a data store of a train consist. At least a portion of the track route information may be downloaded to the data store from a remote processing device before departure.

At least a portion of the measured parameters, the threshold values and/or the track route information may be provided 906 to a machine-learning model for analysis. As discussed above, the machine-learning model may be stored locally by the train consist. Alternatively, the machine-learning model may be stored remotely from a train consist. In the case of the latter, the train consist may send at least a portion of the measured parameters to a remote processing device.

The machine-learning model may analyze at least a portion of the provided information to determine 908 if one or more changes have occurred. For example, a machine-learning model may determine whether one or more measured values exceed a threshold value or a threshold range for a certain period of time. As another example, a machine-learning model may determine whether one or more measured values are below a threshold value or a threshold range for a certain period of time. For example, the period of time may be a threshold value associated with the time duration for a variable.

If the increases in F and/or ω exceeds the time duration threshold ($t_{th}$), then changes to one or more parameters are needed in the ITC in order to maintain communication through the turn. Alternatively, a decrease in F and/or ω over a period of time after one or more such values has exceeded a threshold value may indicate that a train consist is in the process of clearing a tight turn.

For example, an on-board gyroscope may measure acceleration stimulus that is symptomatic with a sharp extended turn scenario. Recognizing that this situation may result in a curtailment of the line-of-sight geometry and may adversely affect radio signal integrity, the machine learning model may attempt to answer "what has happened?" (descriptive analytics), "what could happen?" (predictive analytics", and/or "what should we do?" (prescriptive analytics).

If the machine-learning model determines 908 that one or more changes have not occurred, then the process 900-908 may repeat for one or more new measurement values as illustrated by FIG. 9. If the machine-learning model determines 908 that one or more changes have occurred, then the machine-learning model may adjust a hop distance value and/or a parent/child relationship value of the train consist.

In both the train and railcar networks, every device (child) has one or more other devices (parents) that provide one or more redundant paths to overcome communications interruption due to interference, physical obstruction, multi-path fading and/or the like. If a packet transmission fails on one path, the next re-transmission may try on a different path and different radio channel.

As described above, a network begins to form when the network manager (e.g., a PWG for a train network, a CMU for a railcar network) begins sending "advertisements" or packets that contain information that enables a device to synchronize to the network and request to join. This message exchange is part of the security handshake that establishes encrypted communications between the manager and mote (e.g., a CMU for a train network, a WSN for a railcar network). The manager may set the number of desired parents for each mote. Once motes have joined the network, an ongoing discovery process ensures that the network continually discovers new paths as the radio conditions change. During each discovery interval, a single mote may transmit, and all others may listen. Motes communicate this neighbor discovery information to the manager through a periodic health report, which gives the manager a stream of potential path information to use in optimization and network healing. In addition, each mote in the network may track performance statistics (e.g. quality of used paths, and lists of potential paths) and periodically send that information to the network manager in packets called health reports. The manager uses health reports to continually optimize the network.

During the discovery process after network formation, the train network continually discovers new mote (e.g., CMU) paths for radio communication along the train consist. Motes communicate this neighbor discovery information to the train network manager through a periodic health report, which may give the manager a stream of potential path information to use in optimization and network healing. In the case when a particular CMU becomes non-responsive, the train network system may be able to detect the situation and re-route the WSNs associated with the non-responsive CMU to a neighboring CMU (as determined during the network formation process).

Figure 16:
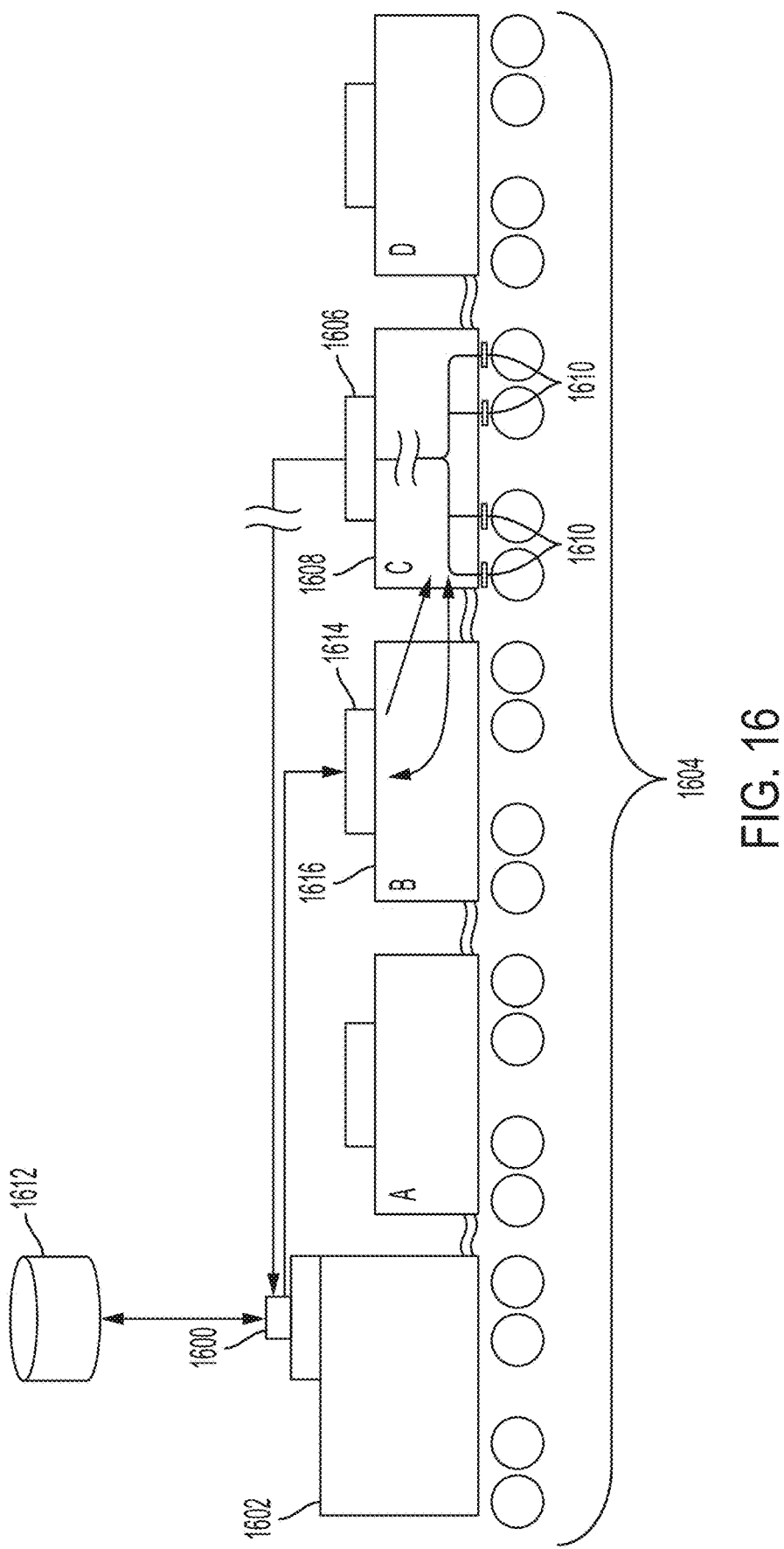
FIG. 16 illustrates an example of a discovery process.

FIG. 16 illustrates an example of a discovery process according to an embodiment. As illustrated by FIG. 16, a PWG 1600 on a locomotive 1602 may establish an optimized radio path relationship for one or more of the CMU motes on the railcar consist 1604.

By way of example CMU 1606 (mote in train network) on railcar C 1608 may become unresponsive. As such, the WSNs 1610 on railcar C 1608 may become "orphaned" in that they have no communication path with the rest of the devices on the train consist.

The PWG 1600, which may be the manager for train network, may identify the nearest neighbors to railcar C (e.g. B & D) that were associated during network formation. For example, a data store 1612 accessible by the PWG 1600 may store information about one or more neighbors of one or more railcars which was determined during network formation. The PWG 1600 may select a successor CMU of an identified nearest neighbor to establish connection with and to act as manager for the orphaned WSNs 1610 on railcar C 1608. In this example, the PWG 1600 may select the CMU 1614 of railcar B 1616 as the successor CMU. The CMU 1614 of railcar B 1616 may then send advertising packets to the WSNs 1610 of railcar C, and the WSNs on railcar C may join the network of railcar B.

Referring back to FIG. 9, a machine-learning model may decrease a hop distance value 910 and/or reduce 912 a parent/child relationship value. If the decreased hop distance value is greater than a threshold value associated with hop distance 914, the machine-learning model may further decrease the hop distance value until it does not exceed the hop distance threshold value. In various embodiment, a hop distance threshold value may be part of the threshold values that are stored by a data store associated with the train consist.

If the parent/child relationship value does not exceed a certain threshold value 916, (e.g., '2'), the machine-learning model may further reduce the parent/child relationship value until such value exceeds the threshold value.

Once the decreased hop distance value does not exceed the hop distance threshold value and/or the parent child relationship value exceeds a threshold value, it may be determined whether 918 a link margin value associated with the train consist exceeds a link margin threshold value. If a link margin value does not exceed a link margin threshold value, then the machine-learning model may further reduce the parent/child relationship and/or decrease the hop length value until the link margin value exceeds the link margin threshold value. By making these adjustments, the train consist may be better suited to maintain communication between the locomotive and the railcars of the train consist while the train consist navigates a tight turn.

In certain embodiments, the system may determine 908 that one or more changes have occurred which may indicate that the tight turn has been cleared. For instance, referring to FIG. 9, if a change is detected, the system may determine 920 whether to restore 922 one or more network parameters. The system may determine 920 to restore 922 one or more network parameters (e.g., parent/child relationship value and/or hop distance value) in response to determining that a detected change is that the tight turn has been cleared (e.g., one or more parameters associated with a tight turn have changed). In response, the system may restore 922 one or more network parameters, such as, for example, the parent/child relationship and/or the hop distance to levels consistent with levels in existence before the tight turn was encountered. For example, the system may increase a hop distance value and/or the parent child relationship value. If the detected change is not indicative that the tight turn has been cleared, the process may continue to step 910 as described above.

The following provides an example of the process described above in connection with FIG. 9. A train with 120 railcars may be assembled in rail yard, Y. An ITC network is formed between the locomotive and all 120 railcars. The train's route may be on railroad X from Point A to Point C. Prior to departure, the ITC may download track route information for its route. For instance, the ITC may download this information from one or more remote processing devices.

The hop distance threshold value for the train consist may be 5 railcars, and the link margin threshold value may be 10 dB. At the time of departure, HD>HDth, LM>LMth, and F<Fth. The parent/child relationship may be greater than 2 (e.g., 6).

The train may depart rail yard Y at Point A on known railroad X for a 200 mile trip to Point C. At Point B, there is a turn of approximately 30 degrees in the track that may result loss of ITC.

As the train approaches Point B, the ITC recognizes the approaching turn in the track based upon the track route information that is stored by the train consist and/or from an increase in F. The train enters the turn at Point B. The gyroscope of the train consist measures an increase in F and/or angular acceleration $\omega > \omega_{th}$. If the increases in F and/or $\omega$ exceeds the time duration threshold ($t_{th}$), then changes to one or more parameters are needed in the ITC in order to maintain communication through the turn.

If F increases such that it exceeds $F_{th}$ and/or w increases such that is exceeds $\omega_{th}$, such increase(s) indicate(s) the need to make an adjustment to the ITC parameters of HD and/or Parent/Child relationship in order to ensure communication between the locomotive and railcars is not lost as the train navigates the turn. For example the ITC may decrease HD (e.g., from 5 railcars to 4 railcars) and/or decrease the Parent/Child relationship (for example from 6 to 4).

The ITC system may compare the current Link Margin (LM) to the Link Margin threshold ($LM_{th}$). If $LM<LM_{th}$ then the ITC may make another adjustment to one or more of the parameters by decreasing HD (e.g., from 4 railcars to 3 railcars) and/or decreasing the Parent/Child relationship (e.g., from 4 to 3).

After these adjustments are made, the ITC may compare the current LM to the $LM_{th}$. If $LM<LM_{th}$, then the ITC may adjust the HD and Parent/Child relationship parameters again. This process may continue until the $LM \geq LM_{th}$. The ITC may maintains the settings where $LM \geq LM_{th}$ until the $F \leq F_{th}$ (for example $F_{th}$ decreases below $F_{th}$) and/or $\omega \leq \omega_{th}$. When $F<F_th$ and/or $\omega<\omega_{th}$, the ITC may make adjustments to change the parameters HD and Parent/Child relationship to settings such that $LM>LM_{th}$.

Figure 10:
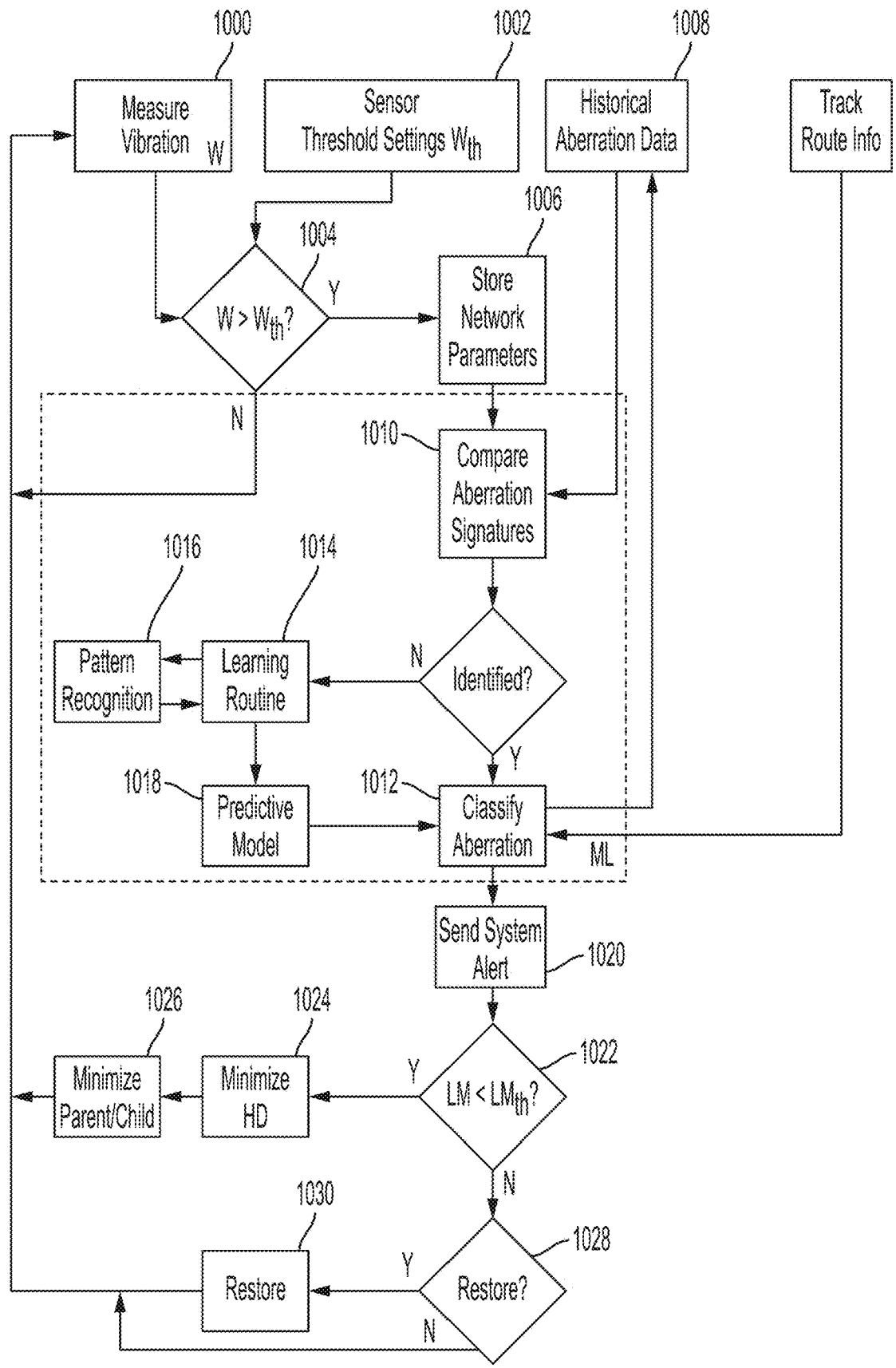
FIG. 10 illustrates an example implementation for processing vibration.

FIG. 10 illustrates an example implementation for processing vibration according to an embodiments. Vibration may be caused by a variety of factors such as, for example, rough or broken tracks. An accelerometer of a train consist (e.g., one that is part of a PWG, a CMU, and/or a WSN) may measure 1000 an amount of vibration being experienced by the train consist or an individual railcar.

In various embodiments, vibration may cause a railcar to exhibit instability modes such as, for example, roll, yaw, pitch and/or bounce. These instability modes may affect system performance in variety of ways. For example, these modes may cause a flood of sensor messages to be generated and/or communicated, which may affect radio communication. As another example, these modes may introduce in-circuit noise, which may compromise radio integrity. These modes may also cause potential mechanical damage which may result in marginal electrical connections and intermittent radio performance.

In an embodiment, a train consist may access 1002 one or more threshold values according to an embodiment. In an embodiment, a data store, such as a data store associated with the train consist, may store one or more threshold values for various parameters, measurement variables and/or network metrics associated with the train consist. In this example, a train consist may access one or more threshold values associated with permissible vibration levels for the train consist.

The measured vibration level may be compared 1004 to the accessed vibration threshold value according to an embodiment. If the measured vibration level does not exceed the vibration threshold value, the system may continue to monitor 1000 vibration levels. If the measured vibration level exceeds the vibration threshold value, the system may store 1006 one or more current network settings in a data store.

As illustrated in FIG. 10, the process may continue to a machine learning model. As discussed above, the machine-learning model may be stored locally by the train consist. Alternatively, the machine-learning model may be stored remotely from a train consist. In the case of the latter, the train consist may send at least a portion of the measured parameters to a remote processing device.

The machine learning model may access 1008 historical aberration data from a data store. Historical aberration data refers to historical sensor data previously experienced by the current train consist or other train consists or railcars. This data may include, without limitation, information pertaining to previously encountered broken track, subsidence, pitch, roll, yaw, bounce and/or the like.

As illustrated by FIG. 10, the machine learning model may compare 1010 at least a portion of the measured vibration data to at least a portion of the historical aberration data and/or track route information.

Track route information may include known information about a train consist's anticipated route such as information pertaining to known adverse conditions, historical travel information by this train consist or other train consists across the same route and/or the like. In various embodiments, track route information may be stored by a data store of a train consist. At least a portion of the track route information may be downloaded to the data store from a remote processing device before departure.

For example, a machine-learning model may determine that a correlation exists if the same or similar level of vibration that a railcar or train consist is experiencing was measured over the same or similar time period and the same area or location of track by the railcar or consist historically, or historically by a different railcar or train consist. For example, if a machine-learning model determines that the amount of vibration that a railcar is experiencing was also experienced by the railcar at the same location along the route during the railcar's previous journey along the route, the machine-learning model may determine that a correlation exists. As another example, if a machine-learning model determines that the amount of vibration that a railcar is experiencing was also experienced by a railcar of the last consist to travel the route at the same or proximate location, the machine-learning model may determine that a correlation exists.

As another example, a machine-learning model may determine that a correlation exists if a railcar experiences railcar tilt or roll for a certain period of time at a same area of track. For example, a machine-learning model may determine that a correlation exists if the same railcar or a different railcar has previously experienced the same level of railcar tilt or roll due to vibrations at the same or proximate area of track.

For example, the comparison may be reveal whether the measured vibration data has a signature that matches or is similar to that present in the historical aberration data. A signature may refer to one or more parameters and/or corresponding parameter values. For example, measured vibration data may include the following parameters: {pitch=X; roll=Y; yaw=Z}. The historical aberration data may include the same or similar signature (e.g., {pitch=X+/−A; roll=Y+/−B; yaw=Z+/−C}) for a previous journey of the same route by a different train consist, in which case the machine learning model may determine that there is a match or similarity.

In response to determining that there is a correlation in signatures, the machine learning model may classify 1012 the aberration and may update the historical aberration data store with at least a portion of the measured vibration information and classification. A classification refers to a type of vibration or cause/source of vibration. Example classifications may include, without limitation, broken track, an area of track subsidence, an area of choppy or rough track, and/or the like, or a combination of any of the foregoing.

In various embodiments, a machine learning model may use the historical aberration data to perform the classification. For example, historical aberration data may include a classification associated with it. The machine learning system may classify 1012 measured vibration information by identifying one or more historical events having a similar signature as the measured vibration data and adopting the same classification as the identified historical event(s). For instance, referring to the example above, a machine learning model may identify a historical event having the same signature as the measured vibration data (i.e., {pitch=X; roll=Y; yaw=Z}) where the historical event was classified as broken track. The machine learning model may classify 1012 the measured vibration data as broken track.

In response to determining that there is no correlation in signatures, the machine learning model may perform one or more learning routines 1014, pattern recognition 1016 and/or predictive modeling techniques 1018 to perform the classification 1012. The machine learning model may update the historical aberration data store with at least a portion of the measured vibration information and classification.

The system may send 1020 a system alert to one or more railcars in the train consist. The system alert may be a notification that vibrations may be experienced by the railcars at the same or similar location along the route where the vibration data was originally measured. For example, the PWG may send 1020 a system alert to one or more of the CMUs in the train consist.

As illustrated by FIG. 10, the system may compare 1022 the current link margin value to a threshold link margin value. If the link margin value does not exceed the threshold link margin value, the system may reduce 1024 the hop distance and may reduce 1026 the parent/child relationship value. If the link margin value exceeds the threshold link margin value, the system may determine 1028 whether to restore 1030 one or more of the network parameters. The system may determine 1028 to restore 1030 one or more network parameters in response to determining that a level or period of vibration has passed (e.g., one or more parameters indicative of such vibration have changed).

For example, the link margin value exceeding the threshold link margin value may indicate that the train consist is no longer experiencing a condition that causes the level of vibration originally measured (e.g., the train consist has passed the area of rough track). In this case, the system may restore 1030 the hop distance and/or the parent child relationship value to levels consistent with levels in existence before the vibration was encountered. For example, the machine-learning model may increase the hop distance value and/or increase the parent/child relationship value to restore them to values consistent with those in effect before the vibration was encountered.

The following provides an example of the process described above in connection with FIG. 10 for a track break situation. A train with 120 railcars may be assembled in rail yard Y, and an ITC network is formed between the locomotive and all 120 railcars. The train route is on known railroad X from Point A to Point C. Hop distance HD>$HD_{th}$ (for example HD=5 railcars). Link Margin LM>$LM_{th}$ (for example $LM_{th}$=10 dB threshold). Parent/Child relationship >2 (for example 6). Prior to departure, the ITC downloaded railroad track route information. For example, the ITC may have downloaded information related to this track route from one or more previous trips from a remote processing device.

The train departs rail yard Y at Point A on known railroad X for a 200 hundred mile trip to Point C. The train approaches Point B on known railroad X. At Point B (Latitude/Longitude Z) on known railroad X, the accelerometer on railcar #1 of the train records a vibration at Point B. Railcar #2 of the train records a vibration at Point B with the same characteristics as the vibration profile from railcar #1. Railcar #3 of the train records a vibration at Point B, which is compared to the vibration profile from railcar #1 and railcar #2. The ITC determines the vibration profile from railcar #3 has a similar vibration profile as railcar #1 and railcar #2. Each railcar in the train consist records a similar vibration profile. This measured data is provided to a machine-learning model, which uses the information to determine that there is a break in the track at Point B (Latitude/Longitude Z) because every railcar that passes over the location has recorded a similar vibration profile. The ITC may send an alert or alarm to the PWG and/or to a remote processing device.

The following provides an example of the process described above in connection with FIG. 10 for a choppy track situation. A train with 120 railcars may be assembled in rail yard Y, and an ITC network is formed between the locomotive and all 120 railcars. The train route is on known railroad X from Point A to Point C. Hop distance HD>$HD_{th}$ (for example HD=5 railcars). Link Margin LM>$LM_{th}$ (for example $LM_{th}$=10 dB threshold). Parent/Child relationship >2 (for example 6). Prior to departure, the ITC downloaded railroad track route information. For example, the ITC may have downloaded information related to this track route from one or more previous trips from a remote processing device.

The train departs rail yard Y at Point A on known railroad X for a 200 hundred mile trip to Point C. The train is traveling at a speed of 30 mph. The accelerometer on each railcar detects a vibration above a threshold value at a geographic location with a duration of, for example, ten seconds. Every railcar in the train registers a vibration above this threshold value with a same duration in the same geographic location over the same distance. This data is provided to a machine-learning model which uses this data to determine that at this geographic location there is track that is defined as "choppy" because every railcar registered a similar vibration profile with approximately the same time duration at the same geographic location. The ITC may send an alert or alarm to the PWG and/or to a remote processing device.

The following provides an example of the process described above in connection with FIG. 10 for a track subsidence situation. A train with 120 railcars may be assembled in rail yard Y, and an ITC network is formed between the locomotive and all 120 railcars. The train route is on known railroad X from Point A to Point C. Hop distance HD>$HD_{th}$ (for example HD=5 railcars). Link Margin LM>$LM_{th}$ (for example $LM_{th}$=10 dB threshold). Parent/Child relationship >2 (for example 6). Prior to departure, the ITC downloaded railroad track route information. For example, the ITC may have downloaded information related to this track route from one or more previous trips from a processing device.

The train departs rail yard Y at Point A on known railroad X for a 200 hundred mile trip to Point C. The train is traveling at a speed of 30 mph. The accelerometer on each railcar detects a vibration above a threshold value at a geographic location along the route. The vibration profile indicates each railcar experiences for example, ten degree left tilt or roll when it passes over geographic location B that lasts for a duration of approximately fifteen seconds. Every railcar in the train registers a vibration above the threshold value with approximately the same ten degree left tilt or roll indication for the same time duration in the same geographic location. The tilt or roll vibration data from each railcar is provided to a machine-learning model, which determines that at this geographic location there is a track subsidence (e.g., an area of the track that is depressed or sunken). The ITC may send an alert or alarm to the PWG and/or to a remote processing device In various embodiments, atmospheric conditions, such as atmospheric moisture, can have significant attenuation effects on signal propagation. The effect on an ITC network can be detrimental.

Figure 11:
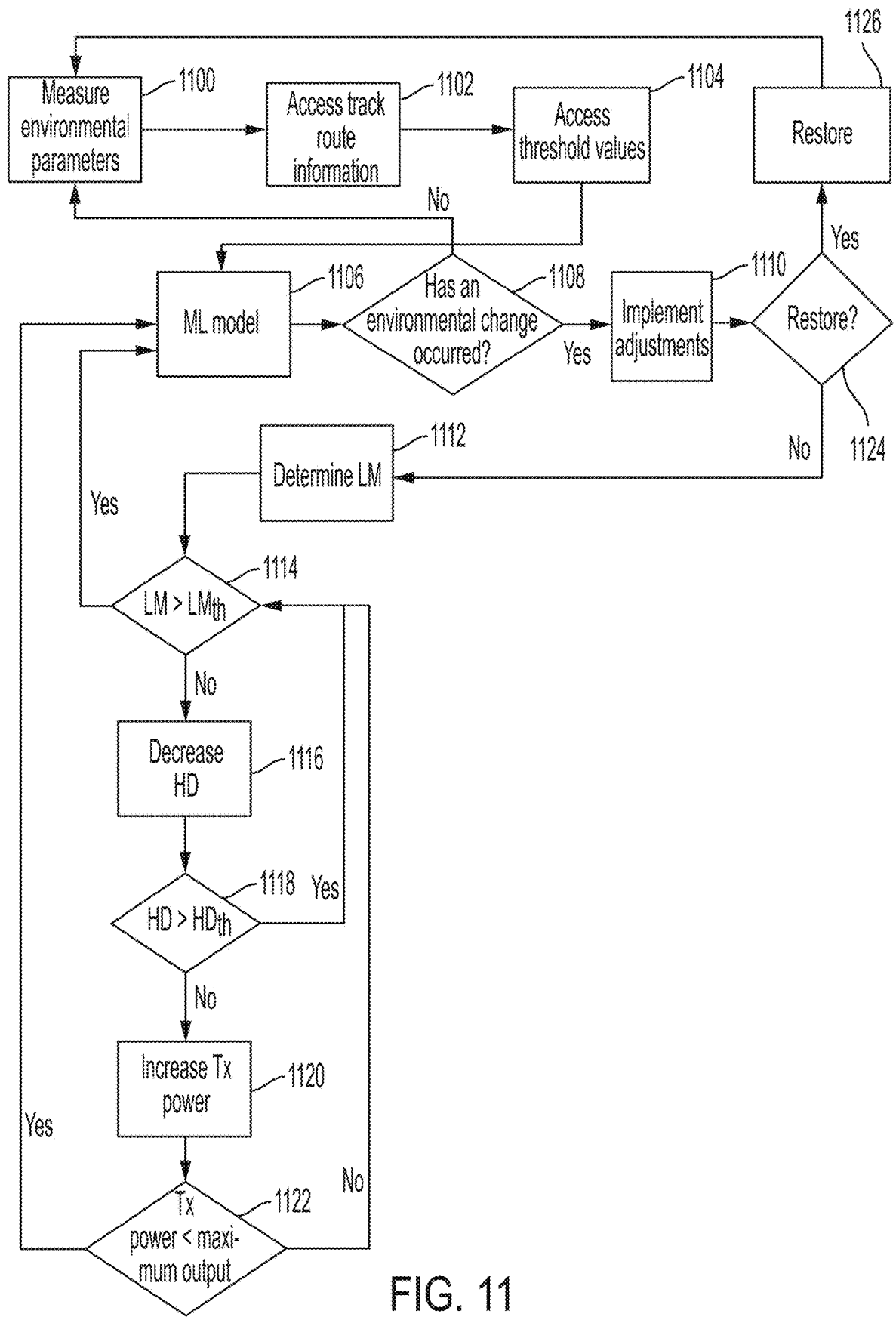
FIG. 11 illustrates an example implementation for processing environmental interference.

FIG. 11 illustrates an example implementation for processing environmental interference according to an embodiment. One or more sensors of a railcar or a train consist may measure 1100 one or more environmental parameter values. For example, a temperature sensor of a railcar in a train consist may measure 1100 a temperature at a certain point in time. Similarly, a humidity sensor of a railcar in a train consist may measure 1100 a humidity value at a certain point in time. In an embodiment, a PWG of a train consist may receive one or more environmental parameter values from a remote processing device.

In an embodiment, a train consist may access 1102 track route information. Track route information may include known information about a train consist's anticipated route such as information pertaining to known adverse conditions, historical travel information by this train consist or other train consists across the same route and/or the like. In various embodiments, track route information may be stored by a data store of a train consist. At least a portion of the track route information may be downloaded to the data store from a remote processing device before departure.

A train consist may access 1104 one or more threshold values according to an embodiment. In an embodiment, a data store, such as a data store associated with the train consist, may store one or more threshold values for various parameters, measurement variables and/or network metrics associated with the train consist.

At least a portion of the environmental parameter values, the threshold values and/or the track route information may be provided 1106 to a machine-learning model for analysis. As discussed above, the machine-learning model may be stored locally by the train consist. Alternatively, the machine-learning model may be stored remotely from a train consist. In the case of the latter, the train consist may send at least a portion of the parameters to a remote processing device.

In various embodiments, an on-board humidity, dampness and/or barometric pressure sensor(s) of the system may measure an atmospheric change that may exceed one or more threshold values. In response the system may generate a notification of the occurrence, recognizing that this situation is typically accompanied by an increase in atmospheric absorption which attenuates the strength of radio signals.

A machine learning model may use at least a portion of the provided information to determine 1108 whether one or more environmental changes have occurred. For example, a machine-learning model may determine 1108 whether one or more measured values exceed a threshold value or a threshold range for a certain period of time. As another example, a machine-learning model may determine whether one or more measured values are below a threshold value or a threshold range for a certain period of time. The period of time may be a threshold value associated with the time duration for a variable. For example, a change may have occurred if the temperature or humidity exceeds a relevant threshold value for a certain period of time. As another example, a change may have occurred if the temperature or humidity fall below a threshold value for a period of time. As another example, a change may have occurred if environmental information received by a PWG (such as, for example, information pertaining to a weather report or future weather predictions) exceed or fall below one or more relevant threshold values.

If the machine-learning model determines 1108 that one or more changes have not occurred, then the process 1100-1108 may repeat for one or more new measurement values as illustrated by FIG. 11. If the machine-learning model determines 1108 that one or more changes have occurred, then the machine-learning model may determine and/or implement 1110 one or more adjustments to be made to a hop distance value and/or a transmission power (Tx) value of the train consist. In various embodiments, Tx may be a power level at which one or more nodes of a network (e.g., a CMU, a WSN, a PWG, and/or the like) transmits.

In various embodiments, one or more adjustments to a hop distance value and/or a Tx value may be made in response to the machine-learning model determining that an environmental condition has passed. For instance, a machine-learning model may adjust the hop distance value and/or the Tx value in response to encountering an environmental condition. As illustrated in FIG. 11, the system may determine 1124 whether to restore 1126 one or more parameters. The system may determine 1124 to restore 1126 one or more parameters in response to determining that an environmental condition has passed (e.g., one or more parameters indicative of such environmental condition have changed). In such a situation, the system may restore 1126 one or more parameters (e.g., the hop distance value and/or the Tx value) to levels consistent with levels in existence before the environmental condition was encountered. For example, the machine-learning model may increase the hop distance value and/or decrease the Tx value to restore them to values consistent with those in effect before the environmental condition was encountered. If the system determines that a restore is not needed (e.g., the detected change is not indicative of the passing of an environmental condition), the process may advance to step 1112 as discussed below.

In an embodiment, a minimum LM threshold value ($LM_{th}$) may be determined 1112. In various embodiments, a LM threshold value may be determined by obtaining it from an applicable data store. If the current LM is greater than $LM_{th}$ 1114, then the process returns to 1106 where the data is recorded and saved to a data store for future use. If the current LM is not greater than $LM_{th}$ 1114, then the HD may be decreased 1116. The current HD value may be compared 1118 to a threshold hop distance ($HD_{th}$). If HD is greater than the $HD_{th}$ 1118, then the LM may be evaluated again at step 1114 as described above. If the HD is not greater than $HD_{th}$ 1118, then transmission power (Tx) may be increased 1120. If Tx is less than a maximum output threshold value 1122, then the process may return to 1106. If Tx is not less than the maximum output 1122, the process may evaluate the LM again at step 1114 as described above.

Based on analysis of such environmental conditions, one or more railcars may adapt network parameter settings as they traverse though changing impairment environments.

The following provides an example of the process described above in connection with FIG. 11 for precipitation atmospheric attenuation according to an embodiment. A train consist with 120 railcars may be assembled in rail yard Y, and an ITC network is formed between the locomotive and all 120 railcars. The train route is on known railroad X from Point A to Point C. Hop distance $HD > HD_{th}$ (for example HD=5 railcars). Link Margin $LM > LM_{th}$ (for example $LM_{th}$=10 dB threshold). Parent/Child relationship >2 (for example 6). Prior to departure, the ITC downloaded railroad track route information and weather report information. For example, the ITC may have downloaded this information from one or more previous trips from a processing device.

The train consist departs rail yard Y at Point A on known railroad X for a 200 hundred mile trip to Point C. The ITC, at regular or periodic time intervals, collects ambient temperature sensor data, humidity sensor data and local weather report and provides this data to a machine-learning model. The ITC establishes a link margin threshold ($LM_{th}$) required to maintain communication from the locomotive to the $120^{th}$ railcar in the train consist.

The local weather reports indicates rain at Point B on known railroad X. The train approaches Point B on known railroad X. The machine-learning model has been learning from the periodic input of humidity sensor data across train consists that there is an increasing humidity level and it is at a threshold where the atmospheric humidity will likely negatively impact the LM of the present consist. The increase in humidity causes the LM to drop below the $LM_{th}$. When the LM drops below the $LM_{th}$, the HD is decreased from 5 to 4. If HD is greater than $HD_{th}$, the LM is checked to determine if the LM is greater than the $LM_{th}$. If the LM is not greater than the $LM_{th}$, the HD is decreased from 4 to 3. This process continues until the LM is greater than or equal to $LM_{th}$ or the HD is less than $HD_{th}$.

If HD drops below $HD_{th}$ and LM still is less than $LM_{th}$, the next step is an increase of Tx power by 1 db, for example. The Tx power is adjusted until $LM \geq LM_{th}$ or Tx power equals Tx power maximum output. If Tx power is greater than maximum power output, then LM and Tx power information is provided to the machine-learning model.

As the train moves out of the local rain pattern, the collection at periodic time intervals of ambient temperature sensor data, humidity sensor data and the local weather report that is provided to the machine-learning model is indicating a decrease in atmospheric humidity. The decreasing humidity informs the ITC, the Tx power can be decreased by 1 dB, for example, which in turns continues until $HD \geq HD_{th}$ and subsequently the HD can be increased from 3 to 4 and so on until the LM is greater than $LM_{th}$.

Figure 12:
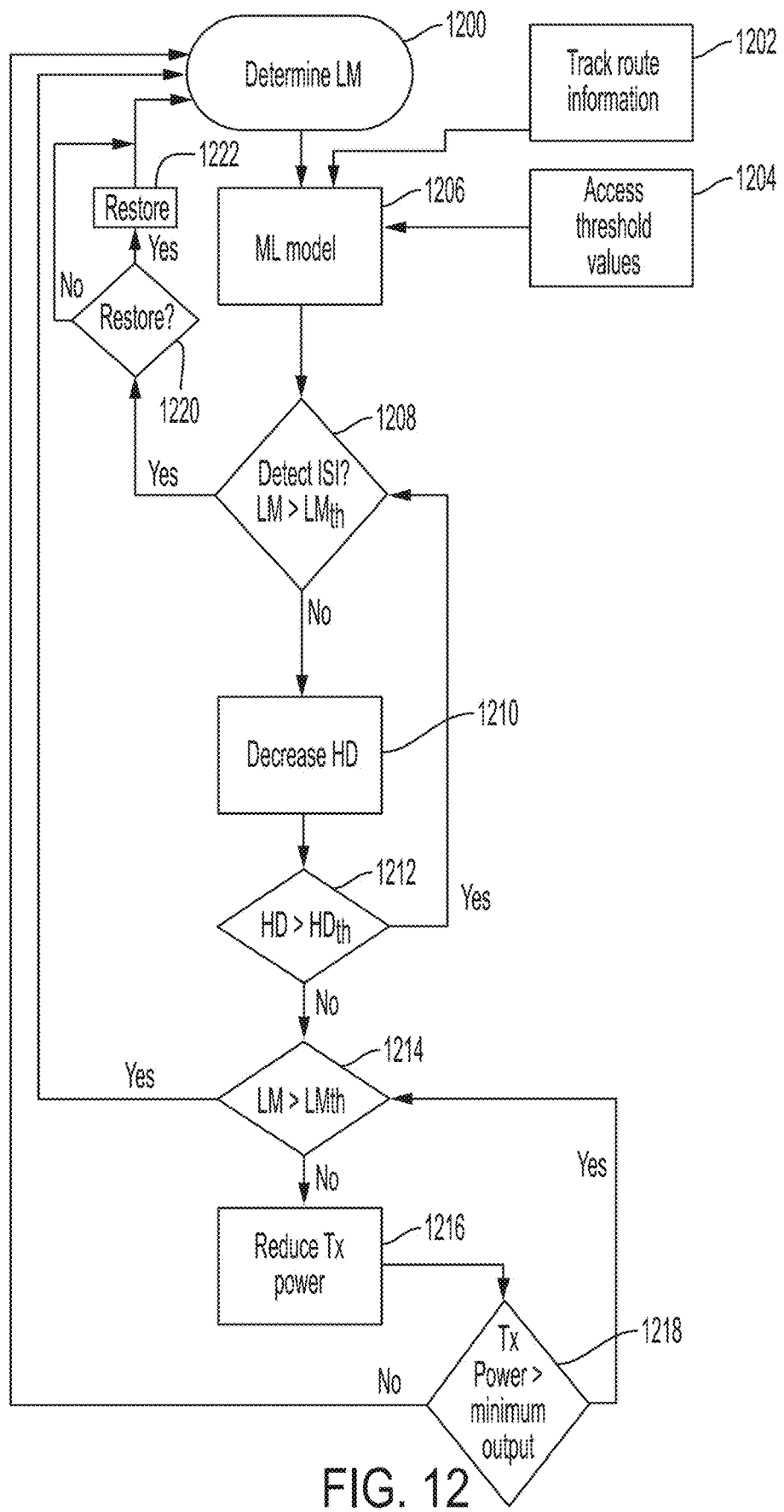
FIG. 12 illustrates an example implementation for processing multi-path scenarios caused by inter-symbol interference.

FIG. 12 illustrates an example implementation for processing multi-path scenarios caused by inter-symbol interference ("ISI") according to an embodiment. ISI refers to a measure of signal corruption or disruption in which one symbol interferes with subsequent symbols at the baseband level. The presence of ISI in the system introduces errors in the decision device at the receiver output. Therefore, in the design of the transmitting and receiving filters, the objective is to minimize the effects of ISI, and thereby deliver the digital data to its destination with a smallest error rate possible.

In various embodiment, an on-board CMU may measure receive signal strength (RSSI) at a front end of a train consist, but may detect data corruption in the processing end of the receiver chain. The system may recognize that this situation is symptomatic of an over-spreading or blurring together of symbols in baseband domain (or intersymbol interference).

As illustrated by FIG. 12, the LM for a train consist may be determined 1200.

In an embodiment, a train consist may access 1202 track route information. Track route information may include known information about a train consist's anticipated route such as information pertaining to known adverse conditions, historical travel information by this train consist or other train consists across the same route and/or the like. In various embodiments, track route information may be stored by a data store of a train consist. At least a portion of the track route information may be downloaded to the data store from a remote processing device before departure.

A train consist may access 1204 one or more threshold values according to an embodiment. In an embodiment, a data store, such as a data store associated with the train consist, may store one or more threshold values for various parameters, measurement variables and/or network metrics associated with the train consist.

At least a portion of the LM value, the threshold values and/or the track route information may be provided 1206 to a machine-learning model for analysis. The machine-learning model may determine 1208 whether ISI is detected. For example, the machine-learning model may determine whether the LM is greater than the $LM_{th}$. If so, then, the machine-learning model may determine 1208 that no ISI is detected, and the process may proceed to step 1220 where the system may determine 1220 whether to restore 1222 one or more network parameters. For instance, the system may determine 1220 whether to restore 1222 one or more parameters in response to determining that a period of ISI has passed or is no longer being experienced (e.g., one or more parameters indicative of ISI have changed). In such a situation, the system may restore 1222 one or more parameters to levels consistent with levels in existence before the ISI was encountered. For example, the system may restore 1222 one or more settings by, for example, making one or more adjustments to a hop distance value and/or a Tx value in response to determining that ISI has passed. For instance, a machine-learning model may adjust the hop distance value and/or the Tx value to levels consistent with levels in existence before the ISI was encountered. For example, the machine-learning model may increase the hop distance value and/or increase the Tx value to restore them to values consistent with those in effect before the ISI was encountered. If the system determines no restore is needed, the process may return to 1200. If the LM is not greater than the $LM_{th}$ then the machine-learning model may determine 1208 that ISI is detected. If ISI is detected, then an adjustment may need to be made to the HD and/or the Tx of the train consist.

As illustrated in FIG. 12, if ISI is detected, the HD may be decreased 1210 in an effort to improve LM and mitigate the effects of multipath or channel non-linearity potentially present in longer communication paths. The current HD is compared 1212 to a threshold hop distance value ($HD_{th}$). If the HD is greater than the $HD_{th}$, the process may evaluate the LM again at step 1208 as described above. If the HD is not greater than $HD_{th}$, the process may continue to step 1214 where the LM is measured.

If the current LM is greater than $LM_{th}$ the process may return to 1200 where the data may be recorded and saved to memory for future use. If the current LM is not greater than than $LM_{th}$ and ISI is still present, this may be due to distortion at the transmitter (e.g., the transmitter is being overdriven), and the Tx may be reduced 1216. Once Tx is reduced, the Tx may be compared 1218 to a minimum output. If the Tx is greater than minimum output, the LM may be evaluated again at step 1214 as described above. If the Tx is not greater than the minimum output, the process may return to 1200 where the data is recorded and saved to memory for future use.

The following provides an example of the process described above in connection with FIG. 12 for detecting ISI according to an embodiment. A train consist with 120 railcars may be assembled in rail yard Y, and an ITC network is formed between the locomotive and all 120 railcars. The train route is on known railroad X from Point A to Point C. Hop distance HD>$HD_{th}$ (for example HD=5 railcars). Link Margin LM>$LM_{th}$ (for example $LM_{th}$=10 dB threshold). Parent/Child relationship >2 (for example 6). Prior to departure, the ITC downloaded railroad track route information. For example, the ITC may have downloaded this information from one or more previous trips from a processing device.

The train departs rail yard Y at Point A on known railroad X for a 200 hundred mile trip to Point C. At the 50 mile mark, the LM begins to decrease and ISI is detected. When ISI is detected, the HD is decreased by one railcar from 5 to 4 for example and/or Tx power increased by 1 dB, for example. Adjustments to HD and Tx power will continue until HD equals $HD_{th}$ or Tx power reaches maximum output. As the train continues on its route to Point C, the ITC determines that ISI is no longer present. Without ISI, the HD and Tx power can be adjusted such that LM≥$LM_{th}$.

Figure 13:
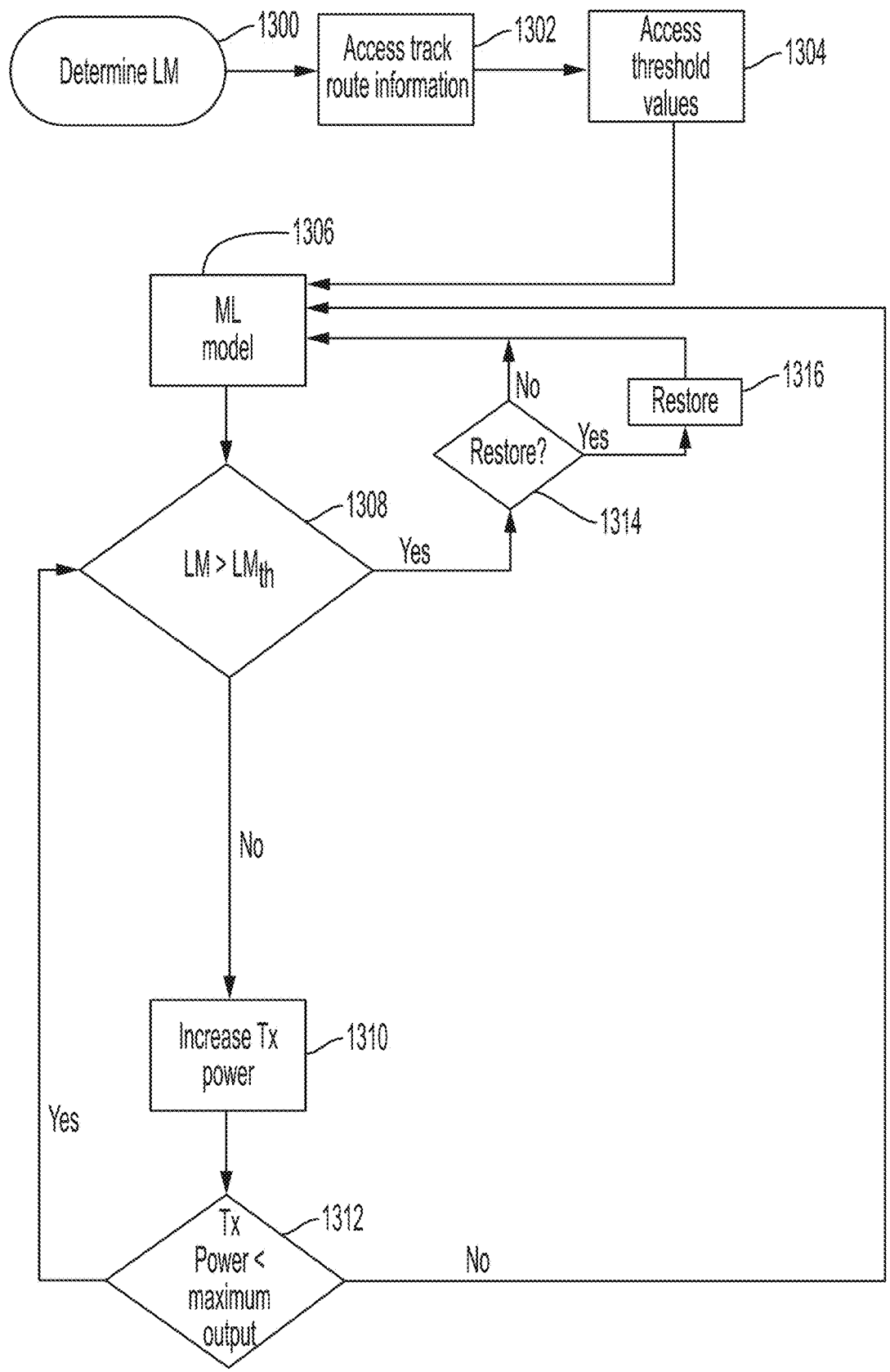
FIG. 13 illustrates an example implementation for processing multi-path scenarios caused by noise interference.

FIG. 13 illustrates an example implementation for processing multi-path scenarios caused by noise interference ("No") according to an embodiment. No refers to any unwanted disturbance in an electrical signal. As illustrated by FIG. 13, the LM for a train consist may be determined 1300.

In an embodiment, a train consist may access 1302 track route information. Track route information may include known information about a train consist's anticipated route such as information pertaining to known adverse conditions, historical travel information by this train consist or other train consists across the same route and/or the like. In various embodiments, track route information may be stored by a data store of a train consist. At least a portion of the track route information may be downloaded to the data store from a remote processing device before departure.

A train consist may access 1304 one or more threshold values according to an embodiment. In an embodiment, a data store, such as a data store associated with the train consist, may store one or more threshold values for various parameters, measurement variables and/or network metrics associated with the train consist.

An on-board CMU may measure poor LM for a communication path or paths that had previously been measuring good LM and may report the same. This may be symptomatic of an introduction of noise or interference in the communication path(s).

At least a portion of the LM value, the threshold values and/or the track route information may be provided 1306 to a machine-learning model for analysis. The machine-learning model may determine 1308 whether noise interference, No, is detected. If the machine-learning model determines that no noise interference is detected, the process returns to 1306 where the data is recorded and saved to a data store for future use.

To determine 1308 whether noise interference is detected, the LM may be compared to a threshold value, $LM_{th}$. If the current LM is greater than $LM_{th}$, the process may return to 1306 where the data may be recorded and saved for future use. If the current LM is not greater than $LM_{th}$, then noise interference may be detected and Tx may be increased 1310. Tx may be compared 1312 a threshold value. If Tx is less than maximum output, LM may be evaluated again at step 1308 as described above. If Tx is not less than the maximum output, then the process may return to 1306 where the data may be recorded and saved for future use.

In an embodiment, the system may determine 1314 whether to restore one or more network parameters in response to detecting that no noise interference or a reduced level of noise interference is detected. For instance, the system may determine 1314 whether to restore 1316 one or more parameters in response to determining that a period of noise interference has passed or is no longer being experienced (e.g., one or more parameters indicative of noise interference have changed). In such a situation, the system may restore 1316 one or more parameters to levels consistent with levels in existence before the noise interference was encountered. One or more adjustments to a Tx value may be made in response to the machine-learning model determining that no noise interference or a reduced level of noise interference is detected. For instance, a machine-learning model may decrease the Tx value to levels consistent with levels in existence before the noise interference was encountered.

The following provides an example of the process described above in connection with FIG. 13 for detection of noise interference according to an embodiment. A train consist with 120 railcars may be assembled in rail yard Y, and an ITC network is formed between the locomotive and all 120 railcars. The train consist route is on known railroad X from Point A to Point C. Hop distance HD>$HD_{th}$ (for example HD=5 railcars). Link Margin LM>$LM_{th}$ (for example $LM_{th}$=10 dB threshold). Parent/Child relationship >2 (for example 6). Prior to departure, the ITC downloaded railroad track route information. For example, the ITC may have downloaded this information from one or more previous trips from a processing device.

The train departs rail yard Y at Point A on known railroad X for a 200 hundred mile trip to Point C. At the 40 mile mark, the LM begins to decrease. Noise interference is detected. When noise interference is detected, the Tx is increased by 1 dB, for example. Adjustments to Tx will continue until LM≥$LM_{th}$ or Tx reaches maximum output. As the train continues on its route to Point C, the ITC determines noise interference is no longer present. Without noise interference, the Tx can be adjusted such that LM≥$LM_{th}$.

Figure 14A:
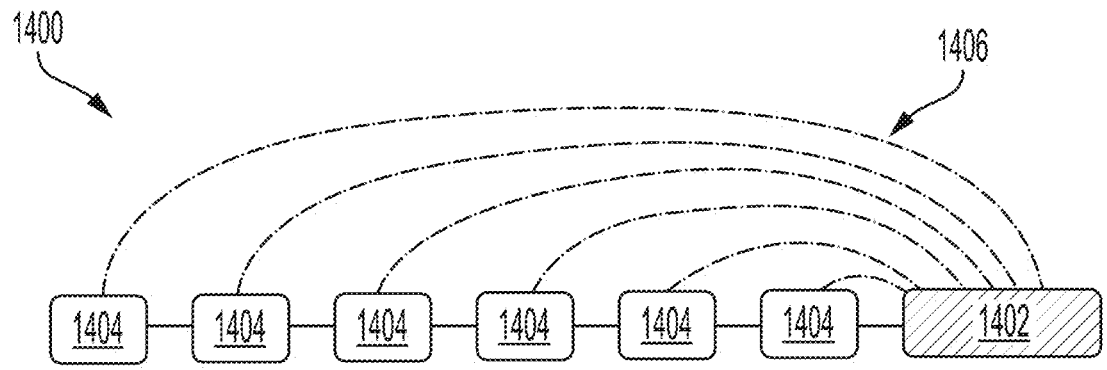
FIGS. 14A-14C illustrate various configurations of an intra-train communication network.
Figure 14B:
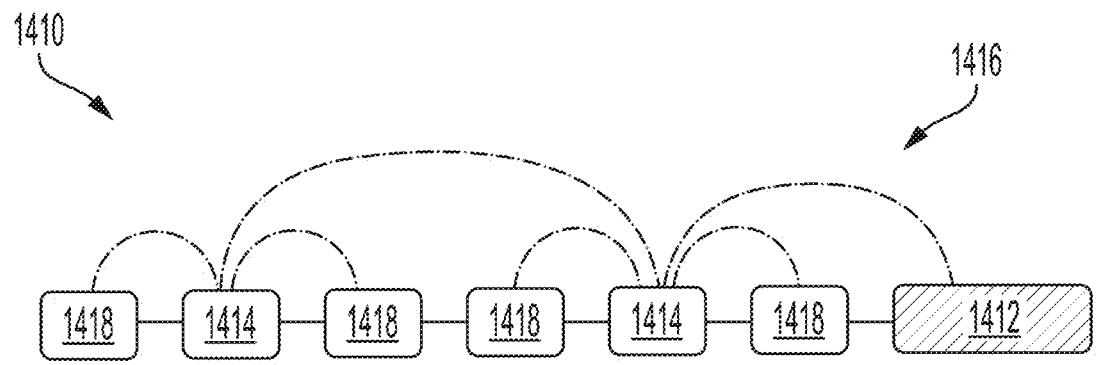
Figure 14C:
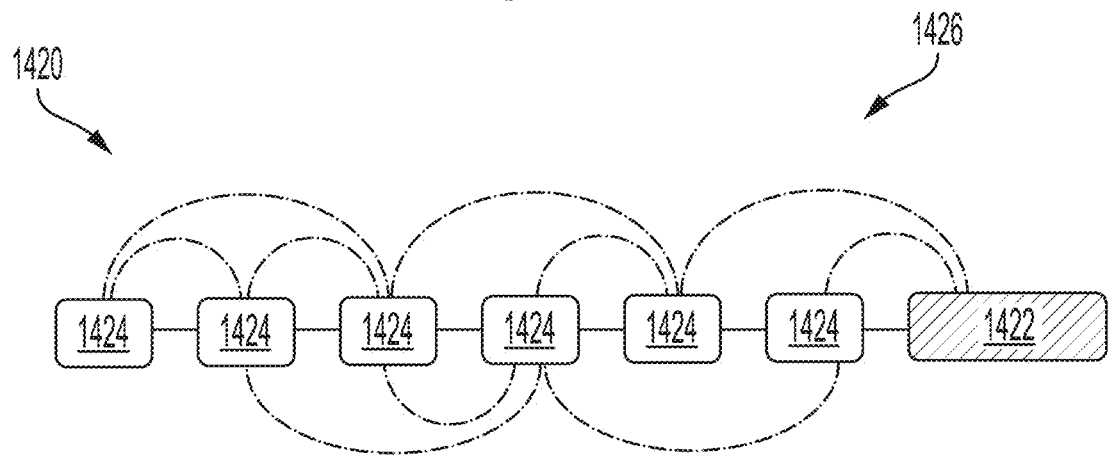

As illustrated in FIG. 14A-14C, ITCs and network nodes of ITCs may be arranged in a number of different configurations. In a star configuration, for example, a central gateway device (such as, for example, a PWG) may communicate directly with each node in the network. Star network configurations must maintain direct network paths to the gateway and do not have any redundancy features. In the example of an ITC network, a star network is shown in FIG. 14A. Train consist 1400 includes a network in a star configuration with locomotive 1402 serving as a gateway and each railcar 1404 serving as a node. Network signals 1406 travel directly between the nodes 1404 and gateway 1402. Thus, the pathway between the locomotive and the last railcar on the train must be maintained. In addition, the locomotive gateway represents a single point of failure without any redundancy.

Referring now to FIG. 14B, train consist 1410 includes a network in a tree configuration with locomotive 1412 acting as a coordinator connecting to two routers 1414 that each, in turn, connect to end nodes 1418. Network signals 1416 connect between coordinator 1412 and routers 1414, and connect between routers 1414 and end nodes 1418. Routers require more power than end nodes and represent a single point of failure with respect to the end nodes connected to them. Tree configurations also present limited options for dynamic network self-healing.

Referring now to FIG. 14C, train consist 1420 includes a network in a mesh configuration. Locomotive 1422 and railcars 1424 represent nodes in the mesh network, with the locomotive node 1422 being a coordinator node that manages all device connections. Each node 1424 is capable of connecting with any other node in the train consist and has multiple transmission paths to improve reliability, lower latency, and decrease power consumption. Practically, connections will be made between near-by nodes. In the example of FIG. 14B, each node 1424 is connected to another node within two railcar lengths. This distance may be longer or shorter depending on the range of the nodes and the environment in which they are used. Mesh networks provide reduced latency to the coordinator 1422 and optimizes both short and long range paths. Mesh networks also enable nodes 1424 to reconfigure and self-heal themselves to continually optimize the network. Paths are continuously optimized for the environment, and will dynamically change to adjust to a varied spatial and RF environment.

Figure 15:
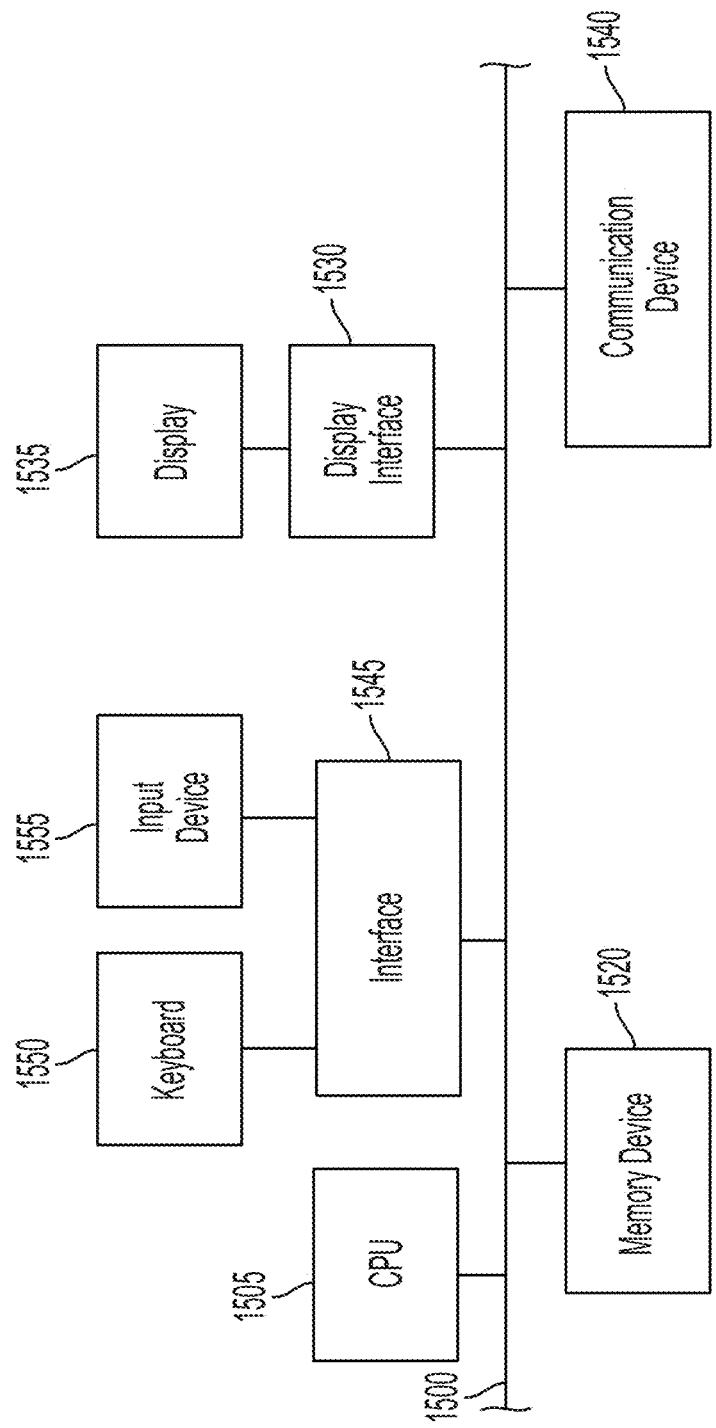
FIG. 15 illustrates a block diagram of hardware that may be used to contain or implement program instructions.

FIG. 15 depicts a block diagram of hardware that may be used to contain or implement program instructions, such as those of a remote server, cloud-based server, electronic device, virtual machine, or container. A bus 1500 serves as an information highway interconnecting the other illustrated components of the hardware. The bus may be a physical connection between elements of the system, or a wired or wireless communication system via which various elements of the system share data. Processor 1505 is a processing device that performs calculations and logic operations required to execute a program. Processor 1505, alone or in conjunction with one or more of the other elements disclosed in FIG. 15, is an example of a processing device, computing device or processor as such terms are used within this disclosure. The processing device may be a physical processing device, a virtual device contained within another processing device, or a container included within a processing device.

A memory device 1520 is a hardware element or segment of a hardware element on which programming instructions, data, or both may be stored. Read only memory (ROM) and random access memory (RAM) constitute examples of memory devices, along with cloud storage services.

An optional display interface 1530 may permit information to be displayed on the display 1535 in audio, visual, graphic or alphanumeric format. Communication with external devices, such as a printing device, may occur using various communication devices 1540, such as a communication port or antenna. A communication device 1540 may be communicatively connected to a communication network, such as the Internet or an intranet.

The hardware may also include a user input interface 1545 which allows for receipt of data from input devices such as a keyboard or keypad 1550, or other input device 1555 such as a mouse, a touch pad, a touch screen, a remote control, a pointing device, a video input device and/or a microphone. Data also may be received from an image capturing device such as a digital camera or video camera. A positional sensor and/or motion sensor may be included to detect position and movement of the device. Examples of motion sensors include gyroscopes or accelerometers. An example of a positional sensor is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method for operating a train consist traveling on a track, comprising:
   receiving, by an electronic device, first sensor data associated with the train consist;
   analyzing, by the electronic device, the first sensor data to detect existence of a condition and/or predict a future existence of the condition;
   performing operations, by the electronic device, to obtain a quantification of an effect of a possible future decision on intra-train communication for the train consist given the existence or predicted future existence of the condition;
   identifying, by the electronic device, one or more updated network parameter settings that will assist in maintaining intra-train communication of the train consist in the condition based on the quantification; and
   automatically changing, by the electronic device, one or more network parameter settings to the identified one or more updated network parameter settings while the train consist is traveling on the track.

2. The method according to claim 1, wherein the condition comprises a tight turn, a broken track, a rough track, or a track subsidence.

3. The method according to claim 1, wherein the condition comprises vibration, atmospheric interference, line-of-sight loss, inter-symbol interference, noise interference or electromagnetic interference.

4. The method according to claim 1, wherein the condition comprises a tunnel, a canyon, or an urban environment.

5. The method according to claim 1, further comprising:
   receiving second sensor data acquired by sensors of another train consist; and
   aggregating the first and second sensor data to produce aggregated sensor data;
   wherein the aggregated sensor data is used during said analyzing.

6. The method according to claim 1, wherein the condition is a physical condition of a portion of track that the train consist is approaching, and the identified one or more updated network parameter settings are implemented while the train is traveling on the track and prior to the train consist reaching the portion of the track.

7. The method according to claim 1, further comprising:
   detecting, by the electronic device, when the train consist travels past the portion of the track and
   automatically restoring the value of said one or more network parameter settings to a previous value responsive to said detecting.

8. The method according to claim 1, wherein said automatically changing causes a hop distance value to be decreased and a link margin value to be increased.

9. The method according to claim 1, further comprising:
   detecting whether a link margin is less than a threshold value;
   wherein the identifying is performed responsive to said detecting; and
   wherein said automatically changing causes a hop distance value to be decreased.

10. The method according to claim 1, further comprising:
    detecting whether a link margin is greater than a threshold value; and
    automatically restoring the value of said one or more network parameter settings to a previous value responsive to said detecting.

11. A system, comprising:
    an electronic device; and
    a computer-readable storage medium comprising one or more programming instructions that, when executed, cause the electronic device to:
      receive first sensor data associated with a train consist traveling on a track;
      analyze the first sensor data to detect existence of a condition and/or predict a future existence of the condition;
      perform operations to obtain a quantification of an effect of a possible future decision on intra-train communication for the train consist given the existence or predicted future existence of the condition;
      identify one or more updated network parameter settings that will assist in maintaining intra-train communication of the train consist in the condition based on the quantification; and
      automatically change one or more network parameter settings to the identified one or more updated network parameter settings while the train consist is traveling on the track.

12. The system according to claim 11, wherein the condition comprises a tight turn, a broken track, a rough track, or a track subsidence.

13. The system according to claim 11, wherein the condition comprises vibration, atmospheric interference, line-of-sight loss, inter-symbol interference, noise interference or electromagnetic interference.

14. The system according to claim 11, wherein the condition comprises a tunnel, a canyon, or an urban environment.

15. The system according to claim 11, wherein the one or more programming instructions that, when executed, further cause the electronic device to:
    receive second sensor data acquired by sensors of another train consist; and
    aggregate the first and second sensor data to produce aggregated sensor data;
    wherein the aggregated sensor data is used to detect existence of a condition and/or predict a future existence of the condition.

16. The system according to claim 11, wherein the condition is a physical condition of a portion of track that the train consist is approaching, and the identified one or more updated network parameter settings are implemented while the train is traveling on the track and prior to the train consist reaching the portion of the track.

17. The system according to claim 11, wherein the one or more programming instructions that, when executed, further cause the electronic device to:
    detect when the train consist travels past the portion of the track and
    automatically restore the value of said one or more network parameter settings to a previous value responsive to said detecting.

18. The system according to claim 11, wherein said automatically change of the one or more network parameter settings causes a hop distance value to be decreased and a link margin value to be increased.

19. The system according to claim 11, wherein the one or more programming instructions that, when executed, further cause the electronic device to:

detecting whether a link margin is less than a threshold value;

wherein the one or more updated network parameter settings are identified responsive to a detection that the link margin is less than a threshold value; and wherein said automatically change of the one or more network parameter settings causes a hop distance value to be decreased.

20. The system according to claim 11, wherein the one or more programming instructions that, when executed, further cause the electronic device to:

detect whether a link margin is greater than a threshold value; and automatically restore the value of said one or more network parameter settings to a previous value responsive to a detection that the link margin is greater than the threshold value.

* * * * *